(12) United States Patent
Friebel et al.

(10) Patent No.: US 7,921,359 B2
(45) Date of Patent: Apr. 5, 2011

(54) COMPUTER-IMPLEMENTED SYSTEM AND METHOD FOR TAGGED AND RECTANGULAR DATA PROCESSING

(75) Inventors: Anthony L. Friebel, Cary, NC (US); Thomas Warren Cox, Holly Springs, NC (US)

(73) Assignee: SAS Institute Inc., Cary, NC (US)

( * ) Notice: Subject to any disclaimer, the term of this patent is extended or adjusted under 35 U.S.C. 154(b) by 583 days.

(21) Appl. No.: 10/126,937

(22) Filed: Apr. 19, 2002

(65) Prior Publication Data

US 2003/0200501 A1    Oct. 23, 2003

(51) Int. Cl.
    *G06F 17/00* (2006.01)
(52) U.S. Cl. .................. 715/249; 715/227; 715/229
(58) Field of Classification Search .......... 715/500, 715/503, 509, 513, 227, 249, 229, 234; 707/500
    See application file for complete search history.

(56) References Cited

U.S. PATENT DOCUMENTS

| | | | |
|---|---|---|---|
| 6,507,856 B1 * | 1/2003 | Chen et al. ................. | 715/205 |
| 6,601,071 B1 | 7/2003 | Bowker et al. | |
| 6,604,100 B1 * | 8/2003 | Fernandez et al. ............ | 707/3 |
| 6,626,957 B1 | 9/2003 | Lippert et al. | |
| 6,636,845 B2 | 10/2003 | Chau et al. | |
| 6,643,633 B2 | 11/2003 | Chau et al. | |
| 6,704,736 B1 * | 3/2004 | Rys et al. ................... | 707/100 |
| 6,721,727 B2 * | 4/2004 | Chau et al. ................. | 707/3 |
| 6,732,095 B1 * | 5/2004 | Warshavsky et al. .......... | 707/5 |
| 6,785,673 B1 * | 8/2004 | Fernandez et al. ............ | 707/3 |
| 6,853,997 B2 * | 2/2005 | Wotring et al. ............. | 707/100 |
| 6,871,204 B2 * | 3/2005 | Krishnaprasad et al. ...... | 707/102 |
| 6,915,304 B2 * | 7/2005 | Krupa ....................... | 707/102 |
| 7,114,123 B2 * | 9/2006 | Chen et al. ................. | 715/205 |
| 2001/0034748 A1 | 10/2001 | Bimson et al. | |
| 2001/0047372 A1 | 11/2001 | Gorelik et al. | |
| 2002/0078068 A1 | 6/2002 | Krishnaprasad et al. | |
| 2002/0091702 A1 | 7/2002 | Mullins | |
| 2002/0099687 A1 | 7/2002 | Krishnaprasad et al. | |
| 2002/0124045 A1 | 9/2002 | Moore et al. | |
| 2002/0129059 A1 | 9/2002 | Eck | |
| 2002/0133484 A1 | 9/2002 | Chau et al. | |

(Continued)

FOREIGN PATENT DOCUMENTS

WO    WO 01/82133    11/2001

OTHER PUBLICATIONS

Lee et al., "CPI: Constraints-Preserving Inlining algorithm for mapping XML DTD to relational schemes", Data & Knowledge Engineering 39, p. 3-25, published 2001.*

(Continued)

*Primary Examiner* — Amelia Rutledge
(74) *Attorney, Agent, or Firm* — Jones Day

(57) ABSTRACT

A computer-implemented system and method for tagged data and rectangular data conversions. The system and method receive tagged input data that is in a non-rectangular format and uses a hierarchical arrangement of tags to indicate data relationships. Data directives are used to parse the tagged input data. The data directives indicate which tags in the hierarchical arrangement of tags are to form which columns in the rectangular formatted data output. The rectangular formatted data output is generated based upon the parsed tagged input data. The data directives may also be used to convert rectangular data into a tagged data format.

25 Claims, 44 Drawing Sheets

U.S. PATENT DOCUMENTS

2002/0156772 A1 10/2002 Chau et al.
2003/0014397 A1 1/2003 Chau et al.
2003/0018661 A1 1/2003 Darugar

OTHER PUBLICATIONS

Bourret, et al., "A Generic Load/Extract Utility for Data Transfer Between XML Documents and Relational Databases", p. 1-10, published 2000 by IEEE.*

Rys, "Bringing the Internet to your database: using SQL server 2000 and XML to build loosely-coupled systems", 17th International Conference on Data Engineering Proceedings, published Apr. 2-6, 2001, p. 465-472.*

Chen et al., "Mining Tables from Large Scale HTML Texts", Proceedings of the 18th conference on Computational linguistics—vol. 1, published 2000, p. 166-172.*

* cited by examiner

```
<?xml version = "1.0" encoding = "iso-8859-1" ?>
<NHL>
    <CONFERENCE> Eastern
        <DIVISION> Southeast
            <TEAM name = "Thrashers"    abbrev = "ATL" />
            <TEAM name = "Hurricanes"   abbrev = "CAR" />
            <TEAM name = "Panthers"     abbrev = "FLA" />
            <TEAM name = "Lightning"    abbrev = "TB"  />
            <TEAM name = "Capitals"     abbrev = "WSH" />
        </DIVISION>
    </CONFERENCE>
    <CONFERENCE> Western
        <DIVISION> Pacific
            <TEAM name = "Stars"    abbrev = "DAL" />
            <TEAM name = "Kings"    abbrev = "LA"  />
            <TEAM name = "Ducks"    abbrev = "ANA" />
            <TEAM name = "Coyotes"  abbrev = "PHX" />
            <TEAM name = "Sharks"   abbrev = "SJ"  />
        </DIVISION>
    </CONFERENCE>
</NHL>
```

Fig. 3

```xml
<?xml version='1.0' ?>
<SXLEMAP version='1.0'>
    <TABLE name='TEAMS'>
        <TABLE_XPATH>
            /NHL/CONFERENCE/DIVISION/TEAM
        </TABLE_XPATH>
        <COLUMN name='name'>
            <XPATH>
                /NHL/CONFERENCE/DIVISION/TEAM/@name
            </XPATH>
            <TYPE>character</TYPE>
            <DATATYPE>STRING</DATATYPE>
            <LENGTH>30</LENGTH>
        </COLUMN>

<COLUMN name='abbrev'>
            <XPATH>
                /NHL/CONFERENCE/DIVISION/TEAM/@abbrev
            </XPATH>
            <TYPE>character</TYPE>
            <DATATYPE>STRING</DATATYPE>
            <LENGTH>3</LENGTH>
        </COLUMN>

<COLUMN name='CONFERENCE' retain='YES'>
            <XPATH>/NHL/CONFERENCE</XPATH>
            <TYPE>character</TYPE>
            <DATATYPE>STRING</DATATYPE>
            <LENGTH>10</LENGTH>
        </COLUMN>

<COLUMN name='DIVISION' retain='YES'>
            <XPATH>
                /NHL/CONFERENCE/DIVISION
            </XPATH>
            <TYPE>character</TYPE>
            <DATATYPE>STRING</DATATYPE>
            <LENGTH>10</LENGTH>
        </COLUMN>
    </TABLE>
</SXLEMAP>
```

Fig. 4

TEAMS ⟋202                    ⟋200

204⟍         206⟍            ⟋208              ⟋210
  CONFERENCE   DIVISION         name              abbrev Eastern      Southeast        Thrashers         ATL
  Eastern      Southeast        Hurricanes        CAR
  Eastern      Southeast        Panthers          FLA
  Eastern      Southeast        Lightning         TB
  Eastern      Southeast        Capitals          WSH
  Western      Pacific          Stars             DAL
  Western      Pacific          Kings             LA
  Western      Pacific          Ducks             ANA
  Western      Pacific          Coyotes           PHX
  Western      Pacific          Sharks            SJ

*Fig. 5*

```
250⟍
       <?xml version = '1.0' encoding = 'iso-8859-1' ?>
252 ⟋ <Library>
       ⟋<Publication>
   254 ⟋  <Title>Developer's Almanac</Title>⟋260
          <Acquired>12-11-2000</Acquired>⟍
   254⟍  <Topic Major = 'Y'>JAVA</Topic>    ⟍262
   256⟍</Publication>
       ⟍<Publication>
                                                  ⟋264
          <Title>Inside Visual C++</Title>⟋
   272⟍<Acquired>06-19-1998</Acquired>⟍
          ⟍<Topic Major = 'Y'>C</Topic>⟍   266
   256⟍  <Topic>Reference</Topic>⟍      ⟍272
       ⟍</Publication>⟍       ⟍274
                         274
       ⟋<Publication>                            ⟋268
   258⟋  <Title>Core Servlets</Title>⟋
          <Acquired>05-30-2001</Acquired>⟍
          <Topic Major = 'Y'>JAVA</Topic>   ⟍270
          <Topic>Servlets</Topic>
   258⟍  <Topic>Reference</Topic>
       ⟍</Publication>
   252⟋</Library>
```

*Fig. 6*

```xml
<?xml version = '1.0' ?>
<SXLEMAP version = '1.0'>
    <TABLE name = 'Publication'>
        <TABLE_XPATH>
            /Library/Publication/Topic
        </TABLE_XPATH>
        <COLUMN name = 'Title' retain = 'YES'>
            <XPATH>
                /Library/Publication/Title
            </XPATH>
            <TYPE>character</TYPE>
            <DATATYPE>STRING</DATATYPE>
            <LENGTH>19</LENGTH>
        </COLUMN>
        <COLUMN name = 'Acquired' retain = 'YES'>
            <XPATH>
                /Library/Publication/Acquired
            </XPATH>
            <TYPE>numeric</TYPE>
            <DATATYPE>FLOAT</DATATYPE>
            <LENGTH>10</LENGTH>
            <FORMAT width = '10' >mmddyy</FORMAT>
            <INFORMAT width = '10' >mmddyy/INFORMAT>
        </COLUMN>
        <COLUMN name = 'TOPIC'>
            <XPATH>
                /Library/Publication/Topic</XPATH>
            <TYPE>character<TYPE>
            <DATATYPE>STRING</DATATYPE>
            <LENGTH>9</LENGTH>
        </COLUMN>
        <COLUMN name = 'Major'>
            <XPATH>
                /Library/Publication/Topic/@Major
            </XPATH>
            <TYPE>character<TYPE>
            <DATATYPE>STRING</DATATYPE>
            <LENGTH>1</LENGTH>
            <ENUM>
                <VALUE>Y</VALUE>
                <VALUE>N</VALUE>
            </ENUM>
            <DEFAULT>N</DEFAULT>
        </COLUMN>
    </TABLE>
</SXLEMAP>
```

Fig. 7

| | 370 | | | |
|---|---|---|---|---|
| | 372 Publication | | 380 | |
| 374 Title | 376 Acquired | 378 Topic | Major | |
| Developer's Almanac | 12/11/2000 | JAVA | Y | |
| Inside Visual C++ | 06/19/1998 | C | Y | |
| Inside Visual C++ | 06/19/1998 | Reference | N | |
| Core Servlets | 05/30/2001 | JAVA | Y | |
| Core Servlets | 05/30/2001 | Servlets | N | |
| Core Servlets | 05/30/2001 | Reference | N | |

*Fig. 8*

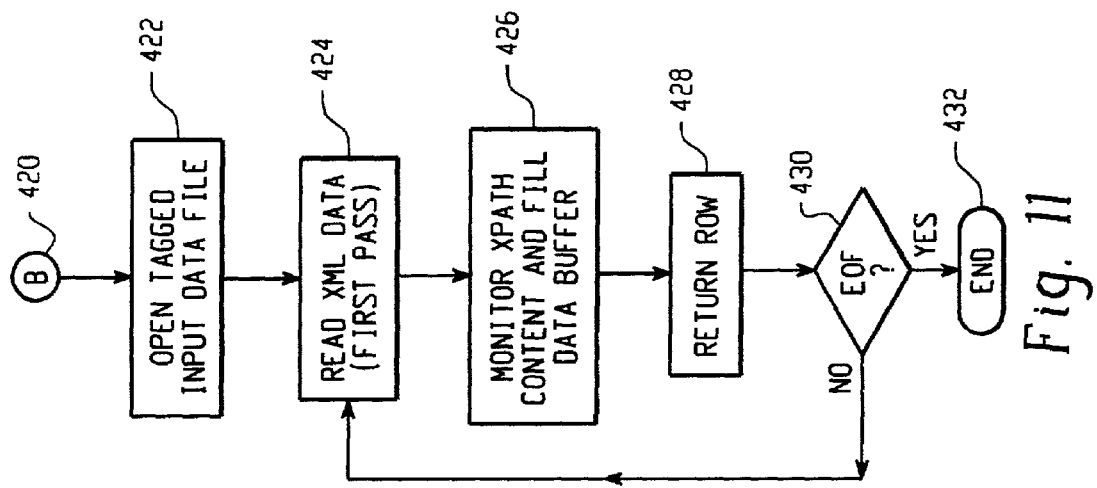
Fig. 11
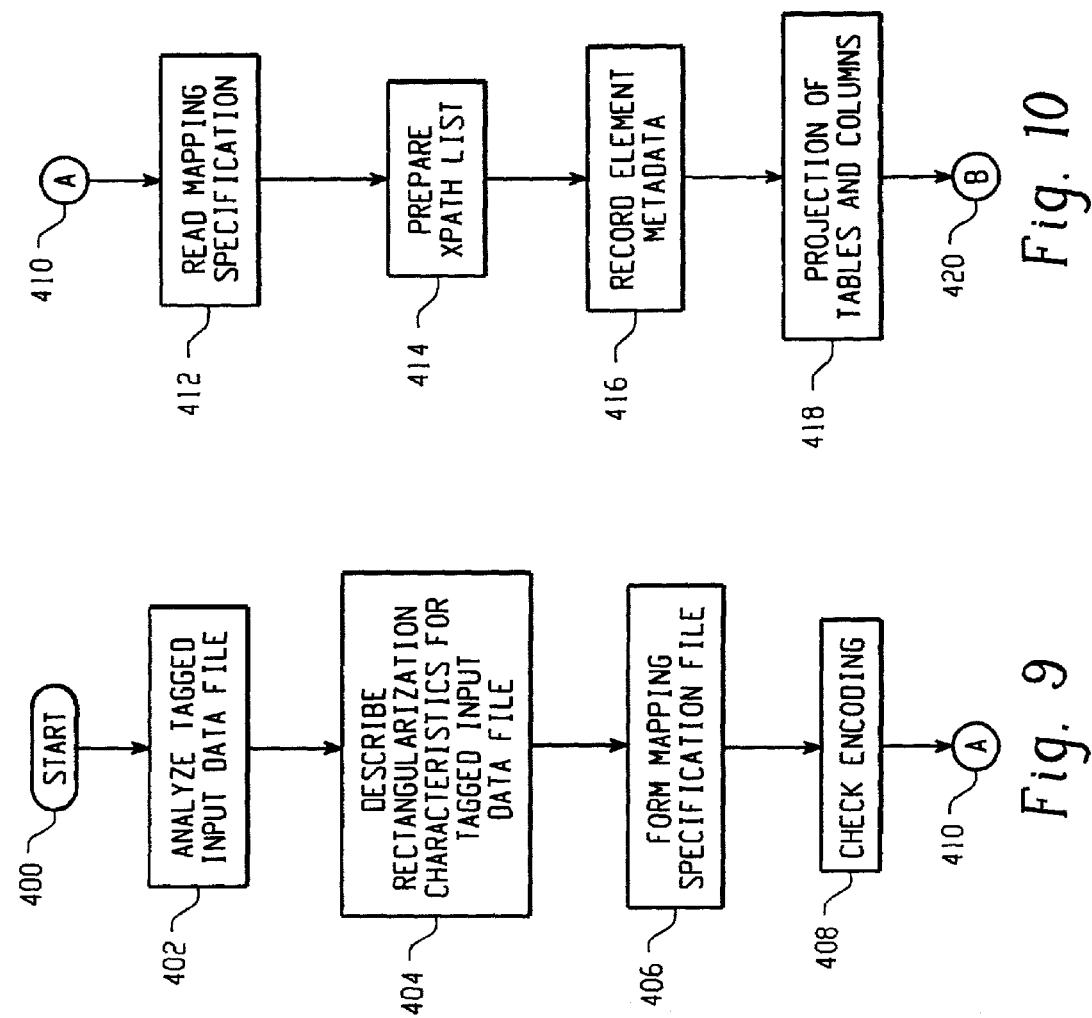
Fig. 10
Fig. 9

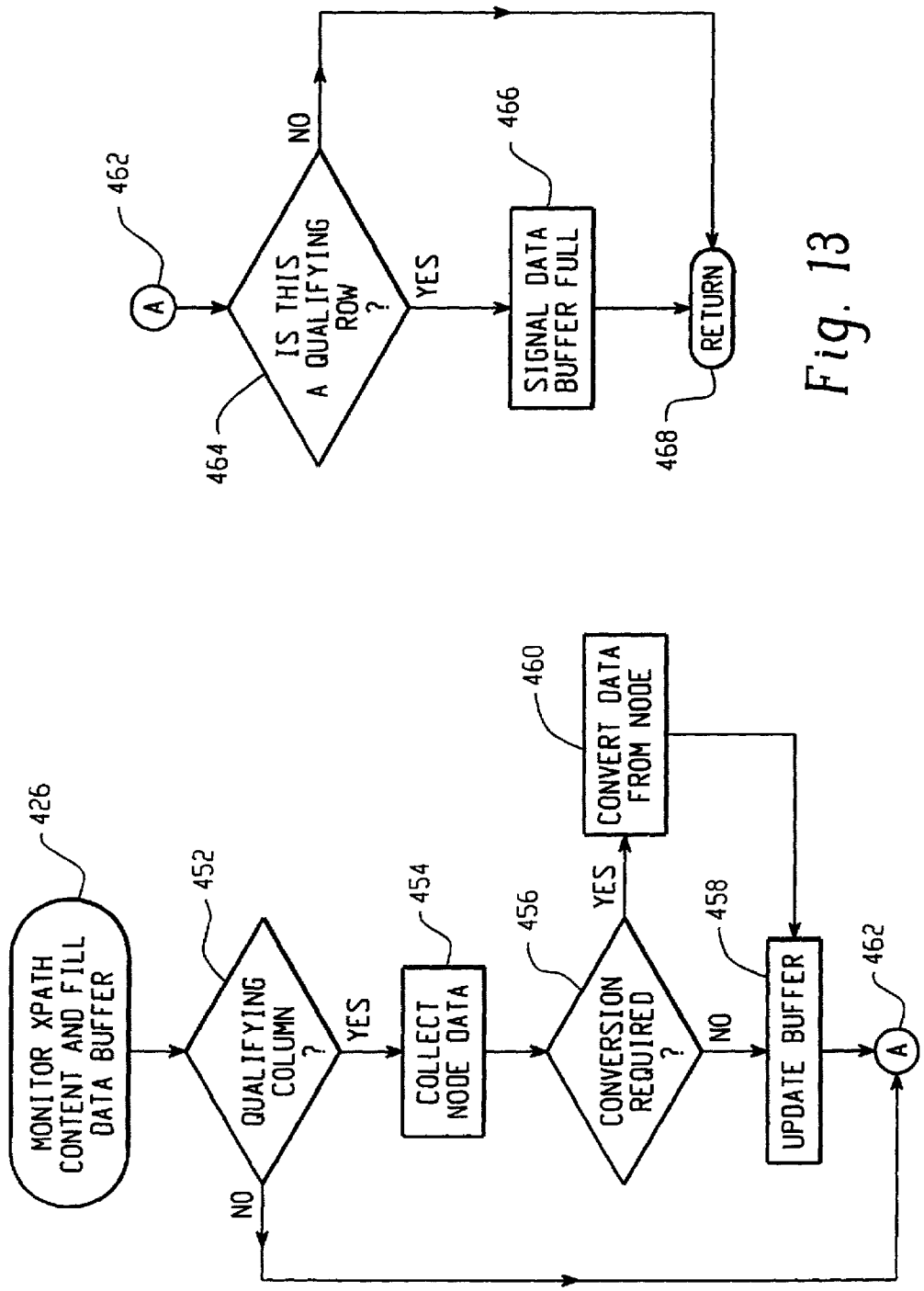

```
<?xml version = "1.0" encoding = "iso-8859-1"?>
<NHL>
    <CONFERENCE> Eastern
        <DIVISION> Atlantic
            <TEAM name = "New Jersey Devils" abbrev = "NJ"/>
            <TEAM name = "New York Islanders" abbrev = "NYI"/>
            <TEAM name = "New York Rangers" abbrev = "NYR"/>
            <TEAM name = "Philadelphia Flyers" abbrev = "PHI"/>
            <TEAM name = "Pittsburgh Penguins" abbrev = "PGH"/>
        </DIVISION>
    </CONFERENCE>
</NHL>
```

*Fig. 17*

```
<?xml version ='1.0' encoding ='iso-8859-1'?>
<SXLEMAP version ='1.2' name ='Section42'
        description ='String Functions Example'>
    <TABLE name = 'concat'>
      <TABLE-PATH>/NHL/CONFERENCE/DIVISION/TEAM</TABLE-PATH>
      <COLUMN name = 'concatpostfix'>
        <TYPE> character </TYPE>
        <DATATYPE> string </DATATYPE>
        <PATH function ='concat' string ='(NHL)'>
          /NHL/CONFERENCE/DIVISION/TEAM/@name
        </PATH>
      </COLUMN>
      <COLUMN name ='concatprefix'>
       <TYPE> character </TYPE>
       <DATATYPE> string </DATATYPE>
       <PATH function='concat' pattern ='2001-2002' >
          /NHL/CONFERENCE/DIVISION/TEAM/@name
       </PATH>
      </COLUMN>
      <COLUMN name ='concat'>
       <TYPE> character </TYPE>
       <DATATYPE> string </DATATYPE>
       <PATH function='concat' pattern ='2001-2002' string ='(NHL)'>
          /NHL/CONFERENCE/DIVISION/TEAM/@name
       </PATH>
      </COLUMN>
    </TABLE>

<TABLE name ='starts-with'>
      <TABLE-PATH>/NHL/CONFERENCE/DIVISION/TEAM</TABLE-PATH>
      <COLUMN name = 'newyork'>
        <TYPE> character </TYPE>
        <DATATYPE> string </DATATYPE>
        <PATH function='starts-with' pattern ='New York'>
          /NHL/CONFERENCE/DIVISION/TEAM/@name
        </PATH>
      </COLUMN>
    </TABLE>
```

*Fig. 18A*

```
                                                        ┌─ 620
                                                       ╱
650 ─┐
     └─<TABLE name ='contains'>
        <TABLE-PATH>/NHL/CONFERENCE/DIVISION/TEAM</TABLE-PATH>
        <COLUMN name = 'new'>
         <TYPE> character </TYPE>
         <DATATYPE> string </DATATYPE>
         <PATH function='contains' pattern = 'New'>
           /NHL/CONFERENCE/DIVISION/TEAM/@name
         </PATH>
        </COLUMN>
      ┌─</TABLE>
650 ─┘

660 ─┐
     └─<TABLE name ='substring-before'>
        <TABLE-PATH>/NHL/CONFERENCE/DIVISION/TEAM</TABLE-PATH>
        <COLUMN name = 'york'>
         <TYPE> character </TYPE>
         <DATATYPE> string </DATATYPE>
         <PATH function='substring-before' pattern ='York'>
           /NHL/CONFERENCE/DIVISION/TEAM/@name
660 ─┐   </PATH>
     ┤  </COLUMN>
     └─</TABLE>

670 ─┐
     └─<TABLE name ='substring-after'>
        <TABLE-PATH>/NHL/CONFERENCE/DIVISION/TEAM</TABLE-PATH>
        <COLUMN name = 'new'>
         <TYPE> character </TYPE>
         <DATATYPE> string </DATATYPE>
         <PATH function='substring-after' pattern = 'New'>
           /NHL/CONFERENCE/DIVISION/TEAM/@name
670 ─┐   </PATH>
     ┤  </COLUMN>
     └─</TABLE>
```

*Fig. 18B*

```
<TABLE name ='substring'>       ─ 680
  <TABLE-PATH>/NHL/CONFERENCE/DIVISION/TEAM</TABLE-PATH>
  <COLUMN name ='first-five'>
    <TYPE> character </TYPE>
    <DATATYPE> string </DATATYPE>
    <PATH function ='substring' index ='1' length ='5'>
      /NHL/CONFERENCE/DIVISION/TEAM/@name
    </PATH>
  </COLUMN>
  <COLUMN name ='fifth-on'>
    <TYPE> character </TYPE>
    <DATATYPE> string </DATATYPE>
    <PATH function='substring' index ='5'>
      /NHL/CONFERENCE/DIVISION/TEAM/@name
    </PATH>
  </COLUMN>
  <COLUMN name ='fifth-eight'>
    <TYPE> character </TYPE>
    <DATATYPE> string </DATATYPE>
    <PATH function='substring' index ='5' length ='4'>
      /NHL/CONFERENCE/DIVISION/TEAM/@name
    </PATH>
  </COLUMN>
</TABLE>       ─ 680

<TABLE name ='string-length'>       ─ 690
  <TABLE-PATH>/NHL/CONFERENCE/DIVISION/TEAM</TABLE-PATH>
  <COLUMN name ='strlen'>
    <TYPE> numeric </TYPE>
    <DATATYPE> integer </DATATYPE>
    <PATH function ='string-length'>
      /NHL/CONFERENCE/DIVISION/TEAM/@name
    </PATH>
  </COLUMN>
</TABLE>       ─ 690
```

*Fig. 18C*

```
                                                                                    ┌─ 620
                                                                                    ↓
700 ─┐ <TABLE name = "normalize">
     │ <TABLE-PATH>/NHL/CONFERENCE/DIVISION/TEAM</TABLE-PATH>  <COLUMN name = "space">
       <TYPE> character </TYPE>
       <DATATYPE> string </DATATYPE>
       <PATH function = "normalize-space">
           /NHL/CONFERENCE/DIVISION/TEAM/@name
       </PATH>
700 ─┐ </COLUMN>
     │ </TABLE>

710 ─┐ <TABLE name = "translate">
     │ <TABLE-PATH>/NHL/CONFERENCE/DIVISION/TEAM</TABLE-PATH>
       <COLUMN name = "original">
       <TYPE> character </TYPE>
       <DATATYPE> string </DATATYPE>
       <PATH>/NHL/CONFERENCE/DIVISION/TEAM/@name </PATH>
       </COLUMN>
       <COLUMN name ="result">
       <TYPE> character </TYPE>
       <DATATYPE> string </DATATYPE>
       <PATH function="translate" pattern = "New" string ="Old">
           /NHL/CONFERENCE/DIVISION/TEAM/@name
       </PATH>
710 ─┐ </COLUMN>
     │ </TABLE>
       </SXLEMAP>
```

*Fig. 18D* concat (750)

| concatpostfix | concatprefix | concat |
|---|---|---|
| New Jersey Devils (NHL) | 2001-2002 New Jersey Devils | 2001-2002 New Jersey Devils (NHL) |
| New York Islanders (NHL) | 2001-2002 New York Islanders | 2001-2002 New York Islanders (NHL) |
| New York Rangers (NHL) | 2001-2002 New York Rangers | 2001-2002 New York Rangers (NHL) |
| Philadelphia Flyers (NHL) | 2001-2002 Philadelphia Flyers | 2001-2002 Philadelphia Flyers (NHL) |
| Pittsburgh Penguins (NHL) | 2001-2002 Pittsburgh Penguins | 2001-2002 Pittsburgh Penguins (NHL) | starts-with (760)

| newyork |
|---|
| false |
| true |
| true |
| false |
| false | contains (770)

| new |
|---|
| true |
| true |
| true |
| false |
| false |

Fig. 19A

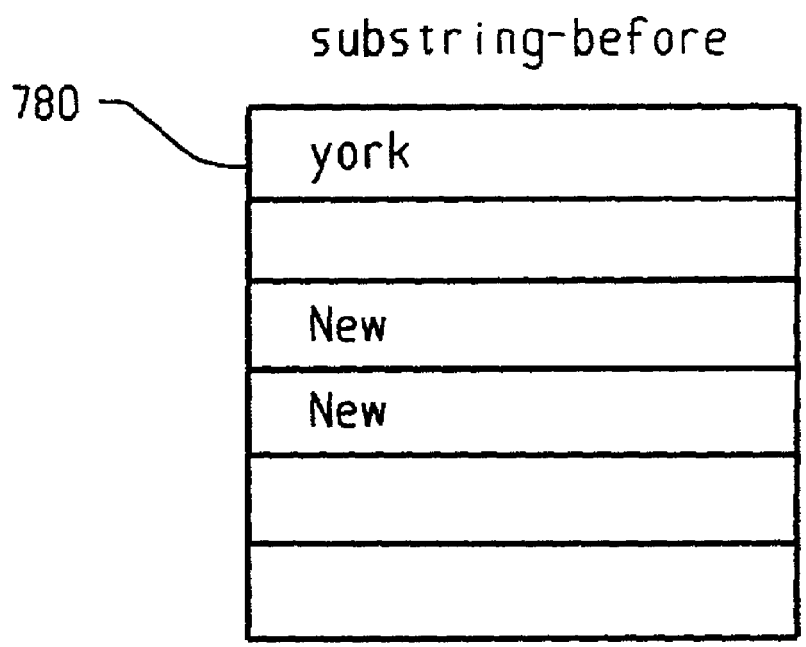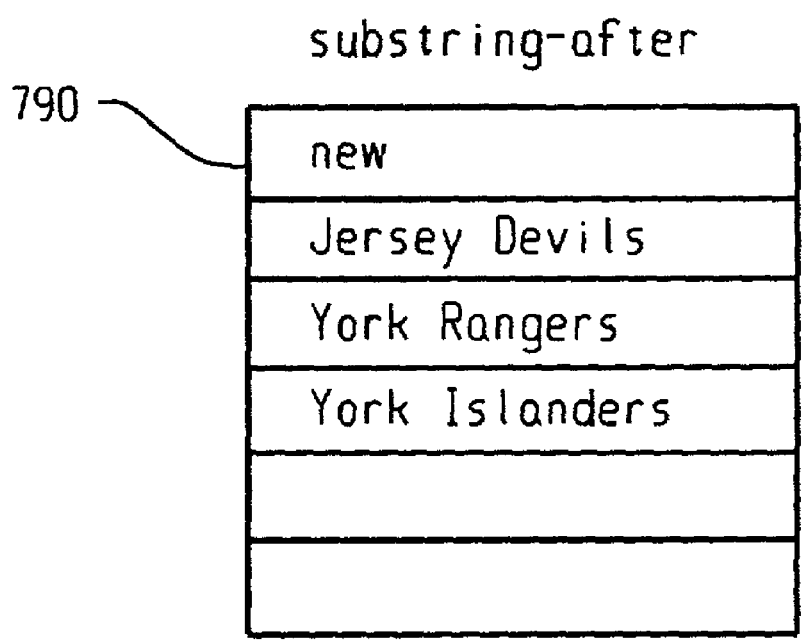
Fig. 19B

| substring | | |
|---|---|---|
| first-five | fifth-on | five-eight |
| New J | Jersey Devils | Jers |
| New Y | York Islanders | York |
| New Y | York Rangers | York |
| Phila | adelphia Flyers | adel |
| Pitts | sburgh Penguins | sbur |

800

| string-length |
|---|
| strlen |
| 17 |
| 18 |
| 16 |
| 19 |
| 19 |

820 — normalize

| space |
|---|
| New Jersey Devils |
| New York Islanders |
| New York Rangers |
| Philadelphia Flyers |
| Pittsburgh Penguins |

830 — translate

| original | result |
|---|---|
| New Jersey Devils | Old JIrsly DIvils |
| New York Islanders | Old York IslaOdlrs |
| New York Rangers | Old York RaOglrs |
| Philadelphia Flyers | PhiladIlphia Flylrs |
| Pittsburgh Penguins | Pittsburgh PlOguiOs |

*Fig. 19D*

MATCH TO FIG. 20A

```
XML source:NHL.xml

<?xml version ='1.0' encoding ='iso-8859-1' ?>
<NHL>
  <CONFERENCE> Eastern
    <DIVISION> Atlantic
      <TEAM name = 'New Jersey Devils' abbrev = 'NJ' />
      <TEAM name = 'New York Islanders' abbrev = 'NYI' />
      <TEAM name = 'New York Rangers' abbrev = 'NYR' />
      <TEAM name = 'Philadelphia Flyers' abbrev = 'PHI' />
      <TEAM name = 'Pittsburgh Penguins' abbrev = 'PGH' />
    </DIVISION>

<DIVISION> Northeast
      <TEAM name = 'Boston Bruins' abbrev = 'BOS' />
      <TEAM name = 'Buffalo Sabres' abbrev = 'BUF' />
      <TEAM name = 'Montreal Canadiens' abbrev = 'MTL' />
      <TEAM name = 'Ottawa Senators' abbrev = 'OTT' />
      <TEAM name = 'Toronto Maple Leafs' abbrev = 'TOR' />
    </DIVISION>

<DIVISION> Southeast
      <TEAM name = 'Atlanta Thrashers' abbrev = 'ATL' />
      <TEAM name = 'Carolina Hurricanes' abbrev = 'CAR' />
      <TEAM name = 'Florida Panthers' abbrev = 'FLA' />
      <TEAM name = 'Tampa Bay Lightning' abbrev = 'TB' />
      <TEAM name = 'Washington Capitals' abbrev = 'WSH' />
    </DIVISION>
  </CONFERENCE>

Ready ...
```

MATCH TO FIG. 20D

Fig. 20C

MATCH TO FIG.20A | MATCH TO FIG.20B

```
Map text:nhl.map

<?xml version = '1.0' ?>
<!-- 2002-02-27T11:28:18.042 -->                            1052
<!-- SAS XML Libname Engine Map -->
<!-- Generated by XMLAtlas. Version 9.0.0.1 -->

<SXLEMAP version = '1.0' name = 'SXLEMAP'>

<TABLE name = 'TEAM'>        1054
        <TABLE-XPATH>/NHL/CONFERENCE/DIVISION/TEAM</TABLE-XPATH>
1056
    <COLUMN name = 'Name'>
        <XPATH>/NHL/CONFERENCE/DIVISION/TEAM/@name</XPATH>
        <TYPE>character</TYPE>
        <DATATYPE>STRING</DATATYPE>
1056    <LENGTH>30</LENGTH>                 1058
    </COLUMN>

<COLUMN name = 'Abbrev'>
        <XPATH>/NHL/CONFERENCE/DIVISION/TEAM/@abbrev</XPATH>
        <TYPE>character</TYPE>
        <DATATYPE>STRING</DATATYPE>
        <LENGTH>3</LENGTH>
    </COLUMN>

<COLUMN name = 'Conference' retain = 'YES'>
        <XPATH>/NHL/CONFERENCE</XPATH>
        <TYPE>character</TYPE>
```

MATCH TO FIG.20C | MATCH TO FIG.20E

MATCH TO FIG.20B

SAS code: <untitled>

```
/* * * * * * * * * * * * * * * * * * * *
 *   Generated by XMLAtlas. v. 9.0.0.1
 * * * * * * * * * * * * * * * * * * * */
/*
 *   ENVIRONMENT
 */
filename NHL 'c:\data\NHL.xml';
filename SXLEMAP 'c:\data\nhl.map';
libname  NHL xml xmlmap=SXLEMAP access=READONLY;
/*
 *   CATALOG
 */
proc datasets lib=NHL; run;
/*
 *   SAMPLE USAGE
 */
proc contents data=NHL.TEAM varnum; run;
proc print data=NHL.TEAM; run;
```

Fig. 20E

MATCH TO FIG.21A

```
XML source: NHL.xml

<?xml version ='1.0' encoding ='iso-8859-1' ?>
<NHL>
   <CONFERENCE> Eastern                              900
      <DIVISION> Atlantic
         <TEAM name = 'New Jersey Devils' abbrev = 'NJ' />
         <TEAM name = 'New York Islanders' abbrev = 'NYI' />
         <TEAM name = 'New York Rangers' abbrev = 'NYR' />
         <TEAM name = 'Philadelphia Flyers' abbrev = 'PHI' />
         <TEAM name = 'Pittsburgh Penguins' abbrev = 'PGH' />
      </DIVISION>

<DIVISION> Northeast
         <TEAM name = 'Boston Bruins' abbrev = 'BOS' />
         <TEAM name = 'Buffalo Sabres' abbrev = 'BUF' />
         <TEAM name = 'Montreal Canadiens' abbrev = 'MTL' />
         <TEAM name = 'Ottawa Senators' abbrev = 'OTT' />
         <TEAM name = 'Toronto Maple Leafs' abbrev = 'TOR' />
      </DIVISION>

<DIVISION> Southeast
         <TEAM name = 'Atlanta Thrashers' abbrev = 'ATL' />
         <TEAM name = 'Carolina Hurricanes' abbrev = 'CAR' />
         <TEAM name = 'Florida Panthers' abbrev = 'FLA' />
         <TEAM name = 'Tampa Bay Lightning' abbrev = 'TB' />
         <TEAM name = 'Washington Capitals' abbrev = 'WSH' />
      </DIVISION>
   </CONFERENCE>
```

Ready ...

MATCH TO FIG.21D

Fig. 21C

MATCH TO FIG.21A | MATCH TO FIG.21B

```
Map text:nhl.map
<?xml version='1.0' ?>
<!-- 2002-02-27T11:28:18.042 -->                    1052
<!-- SAS XML Libname Engine Map -->
<!-- Generated by XMLAtlas, Version 9.0.0.1 -->

<SXLEMAP version='1.0' name='SXLEMAP'>

<TABLE name='TEAM'>
        <TABLE-XPATH>/NHL/CONFERENCE/DIVISION/TEAM</TABLE-XPATH>

<COLUMN name='Name'>       1056
            <XPATH>/NHL/CONFERENCE/DIVISION/TEAM/@name</XPATH>
            <TYPE>character</TYPE>
            <DATATYPE>STRING</DATATYPE>      1120
            <LENGTH>30</LENGTH>
        </COLUMN>                     1122

<COLUMN name='Abbrev'>
            <XPATH>/NHL/CONFERENCE/DIVISION/TEAM/@abbrev</XPATH>
            <TYPE>character</TYPE>
            <DATATYPE>STRING</DATATYPE>
            <LENGTH>3</LENGTH>
        </COLUMN>

<COLUMN name='Conference' retain='YES'>
            <XPATH>/NHL/CONFERENCE</XPATH>
            <TYPE>character</TYPE>
```

MATCH TO FIG.21C | MATCH TO FIG.21E

Fig. 21D

MATCH TO FIG.22A

```
XML source: NHL.xml

<?xml version ='1.0' encoding ='iso-8859-1' ?>
<NHL>                                                    900
    <CONFERENCE> Eastern
        <DIVISION> Atlantic
            <TEAM name = 'New Jersey Devils' abbrev = 'NJ' />
            <TEAM name = 'New York Islanders' abbrev = 'NYI' />
            <TEAM name = 'New York Rangers' abbrev = 'NYR' />
            <TEAM name = 'Philadelphia Flyers' abbrev = 'PHI' />
            <TEAM name = 'Pittsburgh Penguins' abbrev = 'PGH' />
        </DIVISION>

<DIVISION> Northeast
            <TEAM name = 'Boston Bruins' abbrev = 'BOS' />
            <TEAM name = 'Buffalo Sabres' abbrev = 'BUF' />
            <TEAM name = 'Montreal Canadiens' abbrev = 'MTL' />
            <TEAM name = 'Ottawa Senators' abbrev = 'OTT' />
            <TEAM name = 'Toronto Maple Leafs' abbrev = 'TOR' />
        </DIVISION>

<DIVISION> Southeast
            <TEAM name = 'Atlanta Thrashers' abbrev = 'ATL' />
            <TEAM name = 'Carolina Hurricanes' abbrev = 'CAR' />
            <TEAM name = 'Florida Panthers' abbrev = 'FLA' />
            <TEAM name = 'Tampa Bay Lightning' abbrev = 'TB' />
            <TEAM name = 'Washington Capitals' abbrev = 'WSH' />
        </DIVISION>
    </CONFERENCE>

Ready...
```

MATCH TO FIG.22D

Fig. 22C

MATCH TO FIG.22A | MATCH TO FIG.22B

```
Map text:nhl.map

</COLUMN>

<COLUMN name ='Abbrev'>
   <XPATH>/NHL/CONFERENCE/DIVISION/TEAM/@abbrev</XPATH>       —1052
   <TYPE>character</TYPE>
   <DATATYPE>STRING</DATATYPE>
   <LENGTH>3</LENGTH>
</COLUMN>

—1160
<COLUMN name ='Conference' retain ='YES'>
   <XPATH>/NHL/CONFERENCE</XPATH>
   <TYPE>character</TYPE>
   <DATATYPE>STRING</DATATYPE>          —1162
   <LENGTH>7</LENGTH>
</COLUMN>

<COLUMN name ='Division' retain ='YES'>
   <XPATH>/NHL/CONFERENCE/DIVISION</XPATH>
   <TYPE>character</TYPE>
   <DATATYPE>STRING</DATATYPE>
   <LENGTH>8</LENGTH>
</COLUMN>

<COLUMN name ='ID' ordinal ='YES'>
   <INCREMENT-XPATH>/NHL/CONFERENCE/DIVISION/TEAM</INCREMENT-XPATH>
   <TYPE>numeric</TYPE>
   <DATATYPE>INT</DATATYPE>                  1050
</COLUMN>
```

MATCH TO FIG.22C | MATCH TO FIG.22E

Fig. 22D

MATCH TO FIG. 22B

```
SAS code: <untitled>

/ . . . . . . . . . . . . . . . . . . . . . . .
 *
 *    Generated by XMLAtlas, v. 9.0.0.1
 *
 . . . . . . . . . . . . . . . . . . . . . . ./
/*
 *
 *    ENVIRONMENT
 *
 */
filename NHL       'c:\data\NHL.xml';
filename SXLEMAP   'c:\data\nhl.map';
libname  NHL xml xmlmap = SXLEMAP access = READONLY;
/*
 *
 *    CATALOG
 *
 */
proc datasets lib = NHL; run;
/*
 *
 *    SAMPLE USAGE
 *
 */
proc contents data = NHL.TEAM varnum; run;
proc print    data = NHL.TEAM; run;
```

⌐ 67

MATCH TO FIG. 22D

Fig. 22E

MATCH TO FIG.23A

```
XML source: NHL.xml

<?xml version ='1.0' encoding ='iso-8859-1' ?>
<NHL>                                                        900
    <CONFERENCE> Eastern
       <DIVISION> Atlantic
          <TEAM name = 'New Jersey Devils' abbrev = 'NJ' />
          <TEAM name = 'New York Islanders' abbrev = 'NYI' />
          <TEAM name = 'New York Rangers' abbrev = 'NYR' />
          <TEAM name = 'Philadelphia Flyers' abbrev = 'PHI' />
          <TEAM name = 'Pittsburgh Penguins' abbrev = 'PGH' />
       </DIVISION>

<DIVISION> Northeast
          <TEAM name = 'Boston Bruins' abbrev = 'BOS' />
          <TEAM name = 'Buffalo Sabres' abbrev = 'BUF' />
          <TEAM name = 'Montreal Canadiens' abbrev = 'MTL' />
          <TEAM name = 'Ottawa Senators' abbrev = 'OTT' />
          <TEAM name = 'Toronto Maple Leafs' abbrev = 'TOR' />
       </DIVISION>

<DIVISION> Southeast
          <TEAM name = 'Atlanta Thrashers' abbrev = 'ATL' />
          <TEAM name = 'Carolina Hurricanes' abbrev = 'CAR' />
          <TEAM name = 'Florida Panthers' abbrev = 'FLA' />
          <TEAM name = 'Tampa Bay Lightning' abbrev = 'TB' />
          <TEAM name = 'Washington Capitals' abbrev = 'WSH' />
       </DIVISION>
    </CONFERENCE>

Ready ...
```

MATCH TO FIG.23D

Fig. 23C

| MATCH TO FIG.23A | MATCH TO FIG.23B |

```
Map text:nhl.map

<DATATYPE>STRING</DATATYPE>
    <LENGTH>3</LENGTH>
</COLUMN>

<COLUMN name ='Conference' retain ='YES'>
    <XPATH>/NHL/CONFERENCE</XPATH>
    <TYPE>character</TYPE>                        1052
    <DATATYPE>STRING</DATATYPE>
    <LENGTH>7</LENGTH>
</COLUMN>

<COLUMN name ='Division' retain ='YES'>
    <XPATH>/NHL/CONFERENCE/DIVISION</XPATH>
    <TYPE>character</TYPE>
    <DATATYPE>STRING</DATATYPE>
    <LENGTH>8</LENGTH>
</COLUMN>                       1192
                  1190
<COLUMN name ='ID' ordinal = 'YES'>
    <INCREMENT-XPATH>/NHL/CONFERENCE/DIVISION/TEAM</INCREMENT-XPATH>
    <TYPE>numeric</TYPE>
    <DATATYPE>INT</DATATYPE>              1194
</COLUMN>

</TABLE>

</SXLEMAP>                                          1050
```

MATCH TO FIG.23C

MATCH TO FIG.23E

Fig. 23D

MATCH TO FIG.23B

SAS code: <untitled>

```
/* • • • • • • • • • • • • • • • • • • • • • • • • •
 *   Generated by XMLAtlas, v. 9.0.0.1
 * • • • • • • • • • • • • • • • • • • • • • • • • */
/*
 *   ENVIRONMENT
 */
filename NHL     'c:\data\NHL.xml';
filename SXLEMAP 'c:\data\nhl.map';
libname  NHL xml xmlmap=SXLEMAP access=READONLY;
/*
 *   CATALOG
 */
proc datasets lib=NHL; run;
/*
 *   SAMPLE USAGE
 */
proc contents data=NHL.TEAM varnum; run;
proc print    data=NHL.TEAM; run;
```

MATCH TO FIG.23D

COMPUTER-IMPLEMENTED SYSTEM AND METHOD FOR TAGGED AND RECTANGULAR DATA PROCESSING

FIELD OF THE INVENTION

The present invention relates generally to computer-implemented data conversions and more particularly to tagged and rectangular data processing.

BACKGROUND AND SUMMARY

Software applications exchange data in a variety of formats. Two of the more prevalent formats are the tagged hierarchical data format and the rectangular data format. Tagged hierarchical data formats, such as the extensible Markup Language (XML) format, are becoming increasingly popular as they provide a useful data exchange medium for Internet software applications. Rectangular data formats are also widely used as their tabular format is the cornerstone of most database systems.

Incompatibility difficulties arise when software systems using different formats seek to exchange data. The present invention overcomes such difficulties and others by providing a computer-implemented system and method for tagged and rectangular data conversions. The system and method receive tagged input data that is in a non-rectangular format and that uses a hierarchical arrangement of tags to indicate data relationships. Data directives are used to parse the tagged input data. The data directives indicate which tags in the hierarchical arrangement of tags are to form which columns in the rectangular formatted data output. The rectangular formatted data output is generated based upon the parsed tagged input data. Data directives may also be used to convert rectangular data into a tagged data format.

BRIEF DESCRIPTION OF THE DRAWINGS

FIG. 3 is a data structure diagram depicting an example of an input tagged data file;

FIG. 4 is a data structure diagram depicting an example of a mapping specification;

FIG. 5 is a data structure diagram depicting an example of output rectangular formatted data;

FIG. 6 is a data structure diagram depicting a second example of an input tagged data file;

FIG. 7 is a data structure diagram depicting a second example of a mapping specification;

FIG. 8 is a data structure diagram depicting a second example of output rectangular formatted data;

FIGS. 9-13 are flowcharts depicting an operational scenario for processing a tagged input data file;

FIG. 17 is a data structure diagram depicting another example of an input tagged data file;

FIGS. 18A-18D are data structure diagrams depicting another example of a mapping specification;

FIGS. 19A-19D are data structure diagrams depicting another example of output rectangular formatted data.

DETAILED DESCRIPTION

Figure 1:
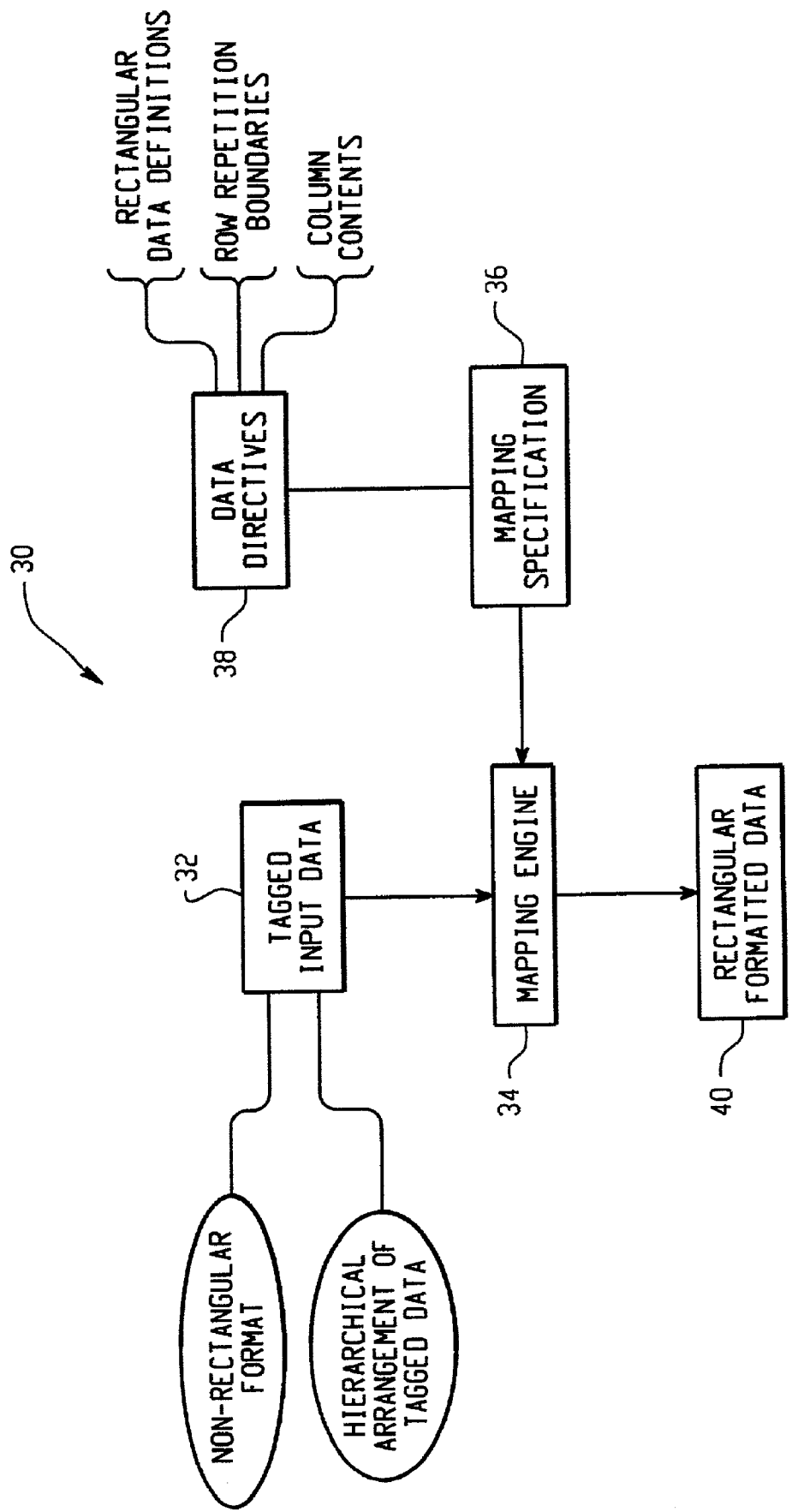
FIG. 1 is a block diagram depicting software and computer components utilized in processing a tagged input data file.

FIG. 1 depicts a computer-implemented system 30 that handles tagged and rectangular data formats. In the example of FIG. 1, the system 30 converts non-rectangular formatted data 32 into rectangular formatted data 40. The conversion can serve many uses, such as to import the converted input data into one or more tables within a relational database management system (RDBMS).

The input data 32 may be considered non-rectangular due to a number of reasons, such as its data items being arranged in a "columnless" tagged hierarchical format. The tags in the hierarchy show how one data item relates to another data item. Data in an extensible Markup Language (XML) format is an example of a tagged hierarchical format.

The system 30 uses a mapping specification 36 to determine how the rectangular formatted output data 40 is to be formed from the tagged input data 32. The mapping specification 36 includes data directives 38 to define how the rectangular output 40 is to be constructed. This may include what columns are to be formed from the tagged input data items; when is a new row in the output to be initiated; and what format the output columns are to assume.

A software mapping engine 34 reads the tagged input data 32 and the mapping specification 36. The mapping engine 34 parses the tagged input data 32 in accordance with the data directives 38 contained in the mapping specification 36. The mapping engine 36 assembles the parsed information into the column format dictated by the data directives 38. The assembled columns are then placed in an output file 40.

Figure 2:
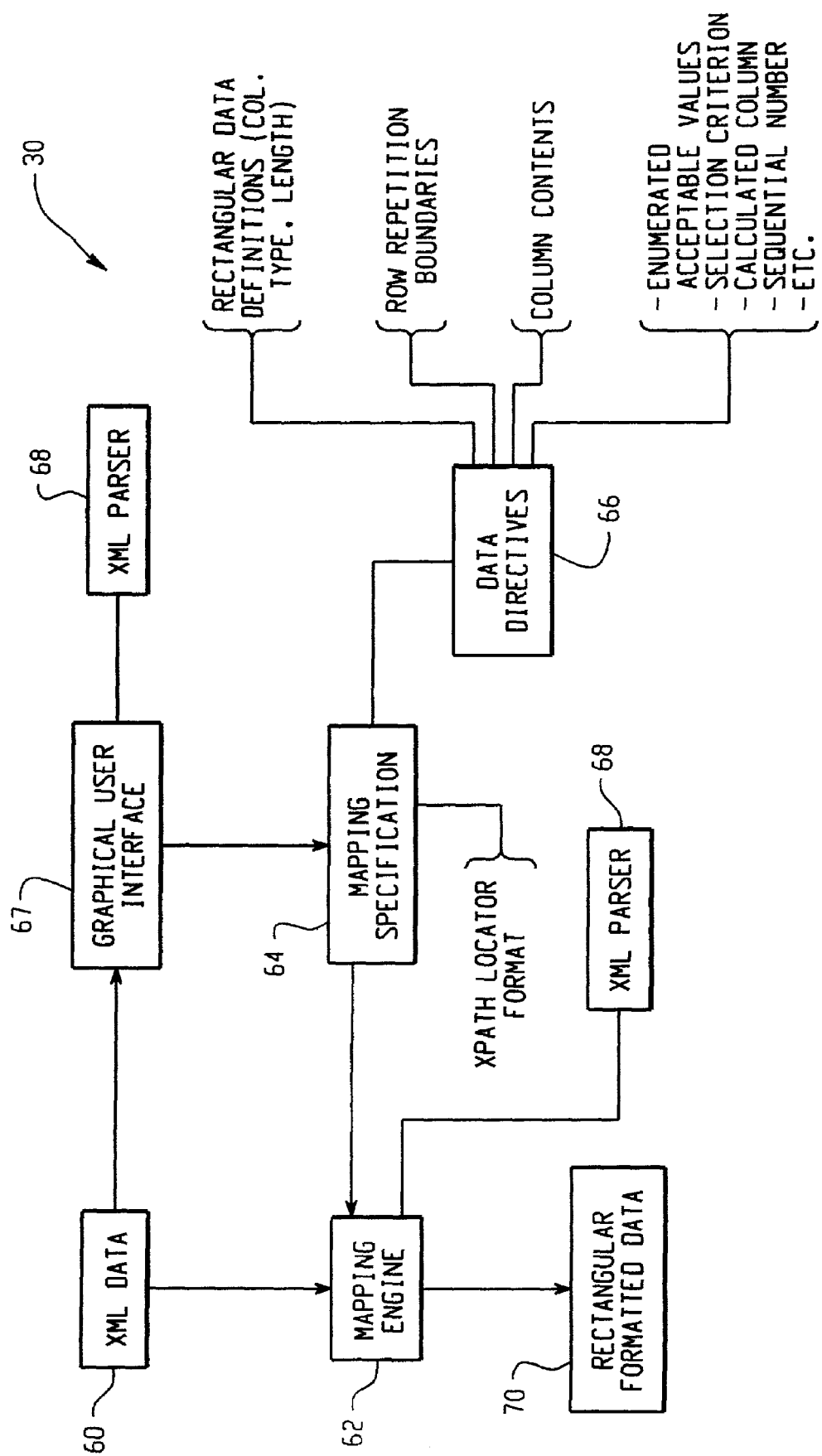
FIG. 2 is a block diagram depicting software and computer components utilized in a different embodiment for processing a tagged input data file.

FIG. 2 shows a different embodiment for processing a tagged input data file 60 that is in an XML data format. In this different embodiment, the mapping specification 64 indicates through an XPath locator format the locations of the tagged input data 60 that is to form the rectangular formatted output 70. For example, if the tagged input data 60 indicates what sport teams are in which conferences and divisions in the National Hockey League (NHL), the mapping specification 64 can use the following XPath locator to identify where the team data is located in the input tagged file: /NHL/CONFERENCE/DIVISION/TEAM. This XPath locator specifies that team information can be collected from the following hierarchical data structure: Teams are contained in Divisions which are contained in Conferences which are contained in the NHL. Based upon the XPath locator, the mapping engine 62 uses an off the shelf XML parser 68 to locate and extract the team data from the tagged input data file 60. The mapping specification 64 may also specify through other XPath locators how to extract other data from the tagged input data file 60, such as data for the other output columns.

In this different embodiment, the mapping specification 64 may be supplemented with additional data directives 66, such as enumerating what are acceptable values to be placed in the rectangular formatted output data 70. For example, a data directive may specify that only "YES" or "NO" values are acceptable for a particular output column. The data directive may also use a selection criterion to filter the values being placed in the rectangular formatted output data 70. In the NHL situation, a selection criteria may specify that only NHL teams whose names begin with the letter "S" are to part of the output. Thus, the teams "Sharks" and "Stars" will be included, but not the team "Thrashers". Other data directives 66 include deriving an output value based upon two or more data items contained in the tagged input data file 60, or associating a sequential counter value with each new row in the output 70.

A graphical user interface 67 may help a user create the data directives 66. Through the graphical user interface 67, a user can see the data items and their relationships contained in the tagged input data file 60. In the NHL example, the user can ascertain more efficiently the mechanism needed to access the teams data within the XML data hierarchy. To generate data for the graphical user interface 67, the data items and their relationships in the XML data file 60 are parsed via an off-the-shelf XML parser 68. Via the graphical user interface 67, the user can select which data items in the XML data file 60 are to form columns in the rectangular output data file 70. The user can also specify column format, selection criteria and other data directives for the column formation.

It should be understood that the system 30 may accept a data stream of XML data instead of a file. In such a situation, the system 30 parses and stores the tagged information as it is received via the data stream and creates new rows when it has received sufficient information from the data stream to form a new row. Moreover, it should be understood that the system 30 may provide its output as a data stream when it creates new rows.

FIGS. 3-5 show an example where the system converts XML data into rectangular formatted data. FIG. 3 shows the input XML data structure 100 for this example. The XML data structure 100 contains tagged hierarchical data about National Hockey League (NHL) teams, such as what teams are in which divisions, and what divisions are in which conferences. NHL tags 102 enclose NHL conference, division, and team data as well their data relationships. The first conference tags 104 contain the Eastern conference data, and the second conference tags 106 contain the Western conference data. The first division tags 108 contain the Southeast division data, and the second division tags 110 contain the Pacific division data. Name and abbreviation attributes within team tags respectively provide the names and abbreviations of the teams. For example, team tag 112 contains the name attribute "Thrashers" and the team abbreviation attribute "ATL".

To convert the XML data into a rectangular format, a mapping specification is constructed. FIG. 4 shows an example of a mapping specification 150 to form a Teams table. The table tags 152 specify that the name of the output table is "TEAMS". The Teams table is to be formed with separate columns for conference data, division data, name data, and abbreviation data. With reference to both FIGS. 3 and 4, the XML data structure 100 is examined to determine where in the XML hierarchy the various data items to form the desired table are located. The mapping specification 150 via XPath locators identify the location where the team data is located in the XML data structure 100. For example, the XPath locator for the teams data is shown at 154 in an XPath specification format. The XPath specification 154 is enclosed within the table_xpath tags 156. The table_xpath tags indicate that a new observation in the output table is to be generated each time a <TEAM> element tag is processed.

The mapping specification 150 is supplemented with column definitions for the desired output Teams table. Column tags within the mapping specification 150 indicate what columns the output table will contain. Column tags 160 indicate the "name" column is to be formed, and they enclose information to form the "name" column. The enclosed information includes: XPath tags 162 to locate the name information within the XML data structure 100; type tags 164 and data type tags 166 to indicate what type the name values will be; and length tags 168 to indicate the variable size. The type for the "name" column is character, and the data type is string. The maximum length of the string within the column is thirty characters. It is noted that the XPath specification within the XPath tags 162 reflects that "name" is an attribute within the XML data structure 100.

Column tags 170 indicate the "abbrev" column is to be formed, and they enclose information to form the "abbrev" column. The enclosed information includes: XPath tags 172 to locate the abbreviation information within the XML data structure 100; type tags 174 and data type tags 176 to indicate what type the abbreviation values will be; and length tags 178 to indicate the variable size. The type for the "abbrev" column is character, and the data type is string. The maximum length of the string within the column is three characters. It is noted that the XPath specification within the XPath tags 172 reflects that "abbrev" is an attribute within the XML data structure 100.

Certain output columns add information about other output column entries, such as foreign keys or external context. Conference column tags 180 and division column tags 190 specify that such supplemental information is to be placed in the output table. Column tags 180 indicate the "conference" column is to be formed, and they enclose information to form the "conference" column. The enclosed information includes: XPath tags 182 to locate the conference information within the XML data structure 100; type tags 184 and data type tags 186 to indicate what type the conference values will be; and length tags 188 to indicate the variable size. The type for the "conference" column is character, and the data type is string. The maximum length of the string within the column is ten characters. It is noted that the XPath specification within the XPath tags 182 reflects that "conference" is a pcdata field within the XML data structure 100.

Column tags 190 indicate the "division" column is to be formed, and they enclose information to form the "division" column. The enclosed information includes: XPath tags 192 to locate the division information within the XML data structure 100; type tags 194 and data type tags 196 to indicate what type the division values will be; and length tags 198 to indicate the variable size. The type for the "division" column is character, and the data type is string. The maximum length of the string within the column is ten characters. It is noted that the XPath specification within the XPath tags 192 reflects that "division" is a pcdata field within the XML data structure 100.

Both the conference column tags 180 and division column tags 190 include a retain attribute. When the retain attribute is set to "YES", it forces the retention of processed data values after an observation is written to the output data set. Because the foreign key fields occur outside the observation boundary (i.e., they are more sparsely populated in the hierarchical XML data than in the output data set), their values are retained for additional rows as they are encountered.

Application of the mapping specification 150 upon the data contained in the XML data structure 100 produces the tabular output 200 shown in FIG. 5. With reference to FIGS. 4 and 5, the output table 202 is labeled "Teams" as dictated by the mapping specification's table tags 152. The table 202 contains the conference column 204, division column 206, name column 208, and abbreviation column 210 as dictated by the mapping specification column tags 160, 170, 180 and 190. The data contained within the columns 204, 206, 208, and 210 reflect the data contained within the input XML data file.

It should be understood that while this example includes only string values, the mapping specification can handle any type of value (including user-defined data types). For example, FIGS. 6-8 depict processing an XML data structure 250 having date fields.

With reference to FIG. 6, the XML data structure 250 contains data about published books in a public library. The XML data structure 250 has publication title information, the date upon which the library acquired the publication, and the topic of the publication. The library tags 252 enclose data about the publications. The publication tags 254, 256, and 258 indicate that there are three publications within the library tags 252. Publication tag 254 has title tag 260 and acquisition date tag 262; publication tag 256 has title tag 264 and acquisition date tag 266; and publication tag 258 has title tag 268 and acquisition date tag 270. The publication tags 254, 256, and 258 also contain tags to indicate the topic of a book. Because a book may cover multiple topics, a publication tag may include multiple topic tags. For example, publication tag 256 includes a first topic tag 272 and a second topic tag 274. The publication entitled "Inside Visual C++" has a first topic "C" and a second topic "Reference". An attribute is included in the first topic tag 272 to indicate that the first topic is the major topic for the publication.

To convert the XML data into a rectangular format, a mapping specification is constructed. FIG. 7 shows an example of a mapping specification 300 to form a Publication table having separate columns for title data, acquisition date data, topic data, and major topic data. With reference to both FIGS. 6 and 7, the XML data structure 250 is examined to determine where in the XML hierarchy the various data items to form the desired table are located. The table tags 302 specify that the name of the output table is "Publication". The mapping specification 300 locates within the XML data structure 250 where the publication data items are located. The table_xpath tags 306 contain this location information at 304 in an XPath specification format.

The mapping specification 300 is supplemented with the column definitions for the desired output Publication table. Column tags (310, 320, 330, and 340) within the mapping specification 300 indicate what columns the table will contain. Column tags 310 indicate the "Title" column is to be formed, and they enclose information to form the "Title" column. The enclosed information includes: XPath tags 312 to locate the name information within the XML data structure 250; type tags 314 and data type tags 316 to indicate what type the Title values will be; and length tags 318 to indicate the variable size. The type for the "Title" column is character, and the data type is string. The maximum length of the string within the column is nineteen characters.

Column tags 320 indicate the "Acquired" column is to be formed, and they enclose information to form the "Acquired" column. The enclosed information includes: XPath tags 322 to locate the acquisition date information within the XML data structure 250; type tags 324 and data type tags 326 to indicate what type the date values will be; and length tags 327 to indicate the variable size. The type for the "Acquired" column is numeric, and the data type is float. Format tags 328 indicate for the output a width of ten and a "mmddyy" format. The informat tags 327 specify the input format for the field. The field is constructed using format/informat controls of the mapping specification. These controls are useful for situations where data (such as dates) must be converted for use by the system. User written formats and informats are supported, and they may be used independently of each other.

Column tags 330 indicate the "Topic" column is to be formed, and they enclose information to form the "Topic" column. It is noted that in this example a publication data item may enclose an arbitrary number of topics. The publication tags 254 enclose one topic data item, while publication tags 256 enclose two topic data items. A new observation is generated in the output each time a <topic> element is encountered in the input file. The information enclosed by tags 330 includes: XPath tags 332 to locate the topic information within the XML data structure 250; type tags 334 and data type tags 336 to indicate what type the topic values will be; and length tags 338 to indicate the variable size. The type for the "Topic" column is character, and the data type is string. The maximum length of the string within the column is nine characters.

Column tags 340 indicate the "Major" topic column is to be formed, and they enclose information to form the "Major" topic column. The enclosed information includes: XPath tags 342 to locate the major topic information within the XML data structure 250; type tags 344 and data type tags 346 to indicate what type the major topic values will be; and length tags 346 to indicate the variable size. The type for the "Major" topic column is character, and the data type is string. The maximum length of the string within the column is one character. Enumerations are also located within the "Major" topic column tags 340. Here, the values expected of the major topic attribute must be either "Y" or "N" as shown by tags 352 and 354. Incoming data values not contained within the ENUM tags 350 are set to MISSING. The MISSING value is the default for data which does not occur in the input file processing unless specifically overridden by a non-MISSING default value as specified by a <DEFAULT> element (e.g., tag 356).

Both the Title column tags 310 and Acquired column tags 320 include a retain attribute. When the retain attribute is set to "YES", it forces the retention of processed data values after an observation is written to the output data set. Because the foreign key fields occur outside the observation boundary (i.e., they are more sparsely populated in the hierarchical XML data than in the output data set), their values are retained for additional rows as they are encountered.

Application of the mapping specification 300 upon the data contained in the XML data structure 250 produces the tabular output 370 shown in FIG. 8. With reference to FIGS. 7 and 8, the output table 372 is labeled "Publication" as dictated by the mapping specification's table tags 302. The table 372 contains the Title column 374, Acquired column 376, Topic column 378, and Major column 380 as dictated by the mapping specification column tags 310, 320, 330 and 340. The data contained within the columns 374, 376, 378, and 380 reflect the data stored within the input XML data file.

It should be understood that a mapping specification may contain multiple table tags so that multiple tables can be formed from the mapping specification. Each table specified in the mapping specification may have different table contents.

FIGS. 9-13 are flowcharts depicting an operational scenario for processing a tagged input data file. With reference to FIG. 9, start indicator 400 indicates that at process block 402, a tagged input data file is to be converted. In this operational scenario, the graphical user interface is used to more easily discern what data items and data relationships are found within the tagged input data file. With this knowledge, a user describes the rectangularization characteristics for the input tagged data file. This description which is to form the mapping specification involves identifying what tables are to be generated from the tagged input data file. Repeating patterns for the data are also identified as well as the output table's column definition. The user may also wish to add any foreign keys or external context. XPath locators are created in order to identify positions in the tagged input data file to extract the data.

Based upon the description of process block 404, the data directives are formed and stored in the mapping specification at process block 406. At process block 408, the encoding contained in the mapping specification is checked to ensure that the encoding of the mapping specification conforms to the data hierarchy of the input tagged data file. Processing continues on FIG. 10 as indicated by continuation block A.

With reference to FIG. 10, the mapping engine reads the mapping specification and prepares at process block 414 the XPath list. The XPath list is prepared in order to specify what data items are to be extracted from the tagged input data.

At process block 416, the element metadata is recorded in order to collect and properly convert data types from source to destination formats, align column length and prioritize data buffering for projection. At process block 418, the tables and columns are projected in order to provide a data storage location as observations are created from the tagged input data file. Processing continues at process block 422 as indicated by the continuation block 420.

With reference to FIG. 11, process block 422 opens the input tagged data file and process block 424 reads the XML data in its first pass through the tagged input data file. The XPath content is monitored and its data buffer is filled with the data from the input tagged data file that corresponds to the XPath specifications. Process block 428 returns a row after the data buffer has been filled in a pass through the tagged input data file. If the end of the input tagged data file has not been reached, then processing returns to process block 424 so that additional XML data from the input file may be read and subsequently processed by process block 426 and 428. However, if the end of the file has been reached, then processing terminates at end block 432. It is noted that a first pass may be used to build the map (e.g., to collect the data types, such as date, strings, etc.). A second pass may then be used to complete the process to construct the output observations. However, it should be understood that one or any number of passes may be used to map and to generate output observations.

FIGS. 12 and 13 depict flowcharts that describe in greater detail process block 426 wherein the XPath content is monitored and the data buffer is filled. With reference to FIG. 12, decision block 452 examines if an XML node qualifies as containing data needed for creating the output table. If it does qualify, then process block 454 collects the XML node data, and decision block 456 examines whether conversion is required for the node data. If conversion is required (e.g., to convert a date value to a different format), then the data from the node is converted at process block 460 and processing continues at 458. If conversion is not required for the node data as determined by decision block 456, then process block 458 is executed wherein the buffer is updated to reflect the collected node data. Processing continues at the continuation indicator 462 either after the buffer has been updated by process block 458 or after decision block 452 has determined that this was not a qualifying XML node. Processing continues on FIG. 13 as indicated by the continuation indicator 462.

With reference to FIG. 13, decision block 464 examines whether an XML node contains data that qualifies as a new row (e.g., it examines whether it is a table XPath tag). If it does not, then processing returns via the return block 468. However if it does, then process block 466 signals that the data buffer is full before allowing the processing to return to the calling program at return block 468.

Figure 14:
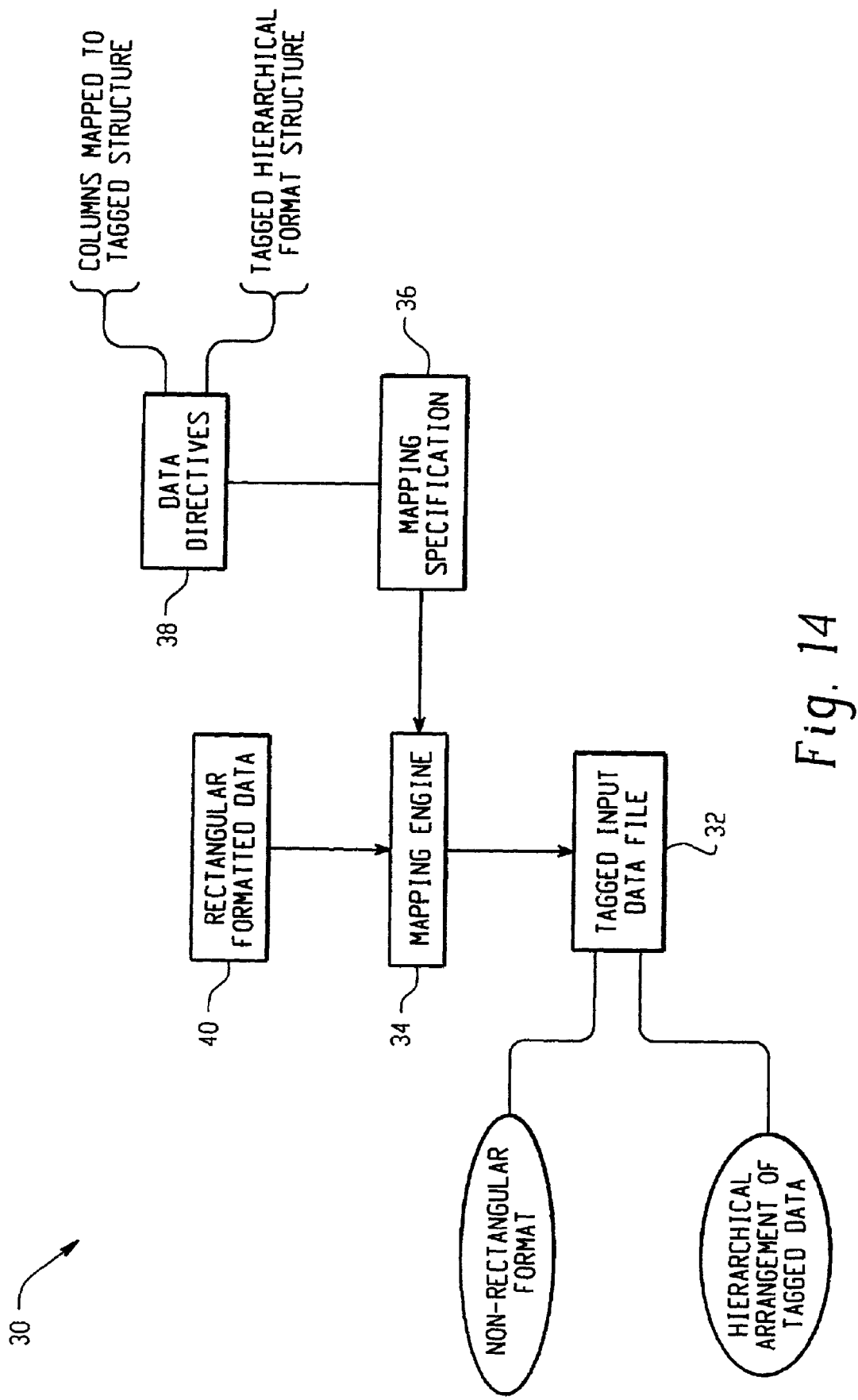
FIG. 14 is a block diagram depicting software and computer components utilized in processing rectangular formatted data.

FIG. 14 depicts a different embodiment of the system 30 wherein rectangular formatted data is converted into a tagged input data file 32. In this way, software applications that converse through tagged data formats can access the rectangular formatted data 40 through the created tagged input data file 32.

During the conversion process, the mapping specification 36 dictates how the columnar data interrelate with each other. This may include specifying hierarchical relationships for the data items contained in the rectangular formatted data 40. The data directives may also differentiate between which rectangular data items are pcdata fields and which are attributes. For example, to create a tagged input data file filled with NHL team data, the data items in a team column would be specified in the data directives 38 as being subordinate in the tagged data hierarchy to the data items in the division column. Moreover, the team names and abbreviation data items would be specified in the data directives 38 as creating attributes for team element fields.

The mapping engine 34 uses the data directives 38 stored in the mapping specification 36 to generate the tagged input data file 32 based upon the rectangular formatted input data 40. In this way, the system 30 is able to go back and forth automatically between the two data formats. Exemplary applications utilizing this interchangeability are shown in FIGS. 15 and 16.

Figure 15:
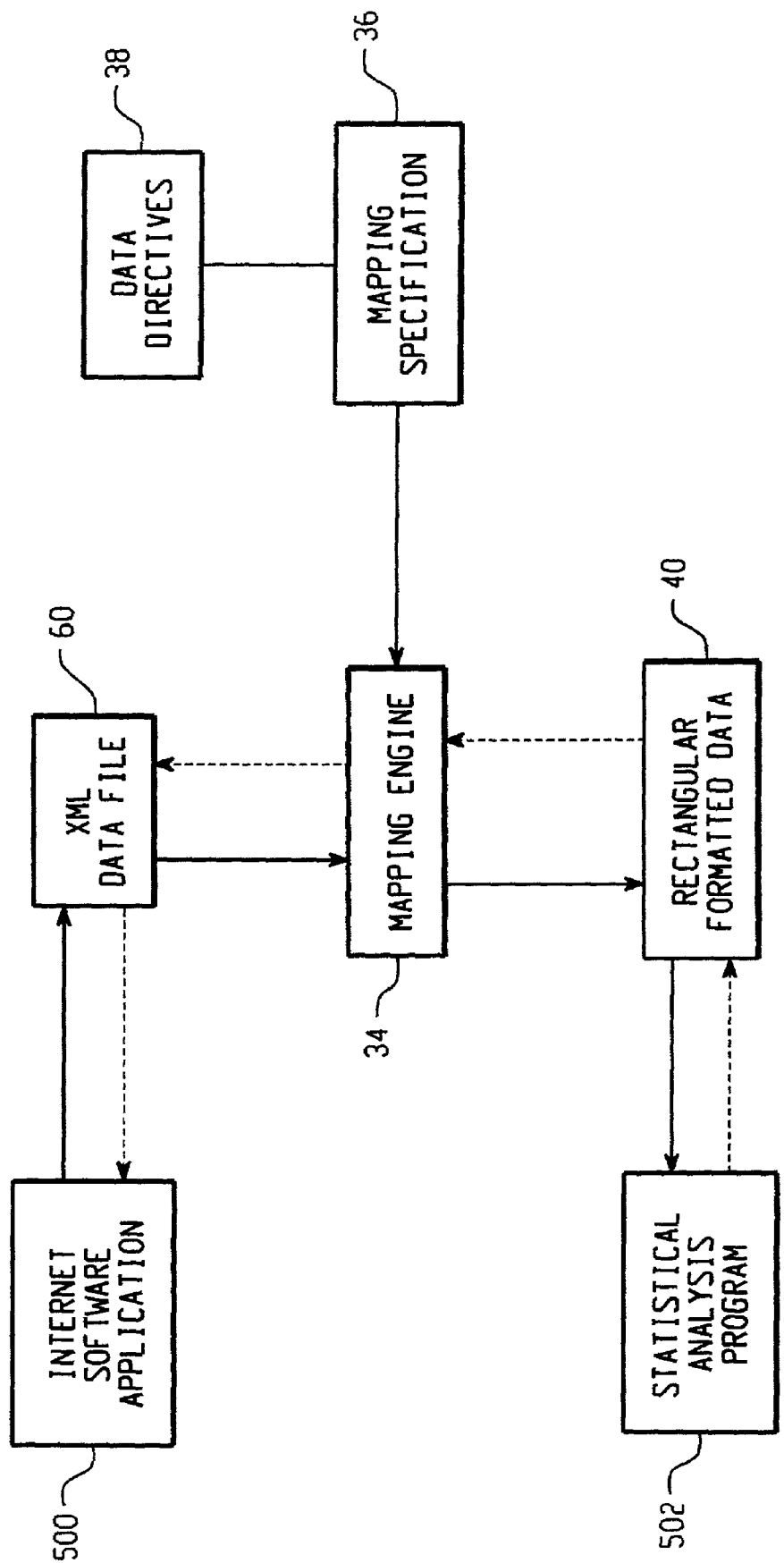
FIGS. 15 and 16 are block diagrams depicting exemplary applications involving tagged and rectangular data processing.
Figure 16:
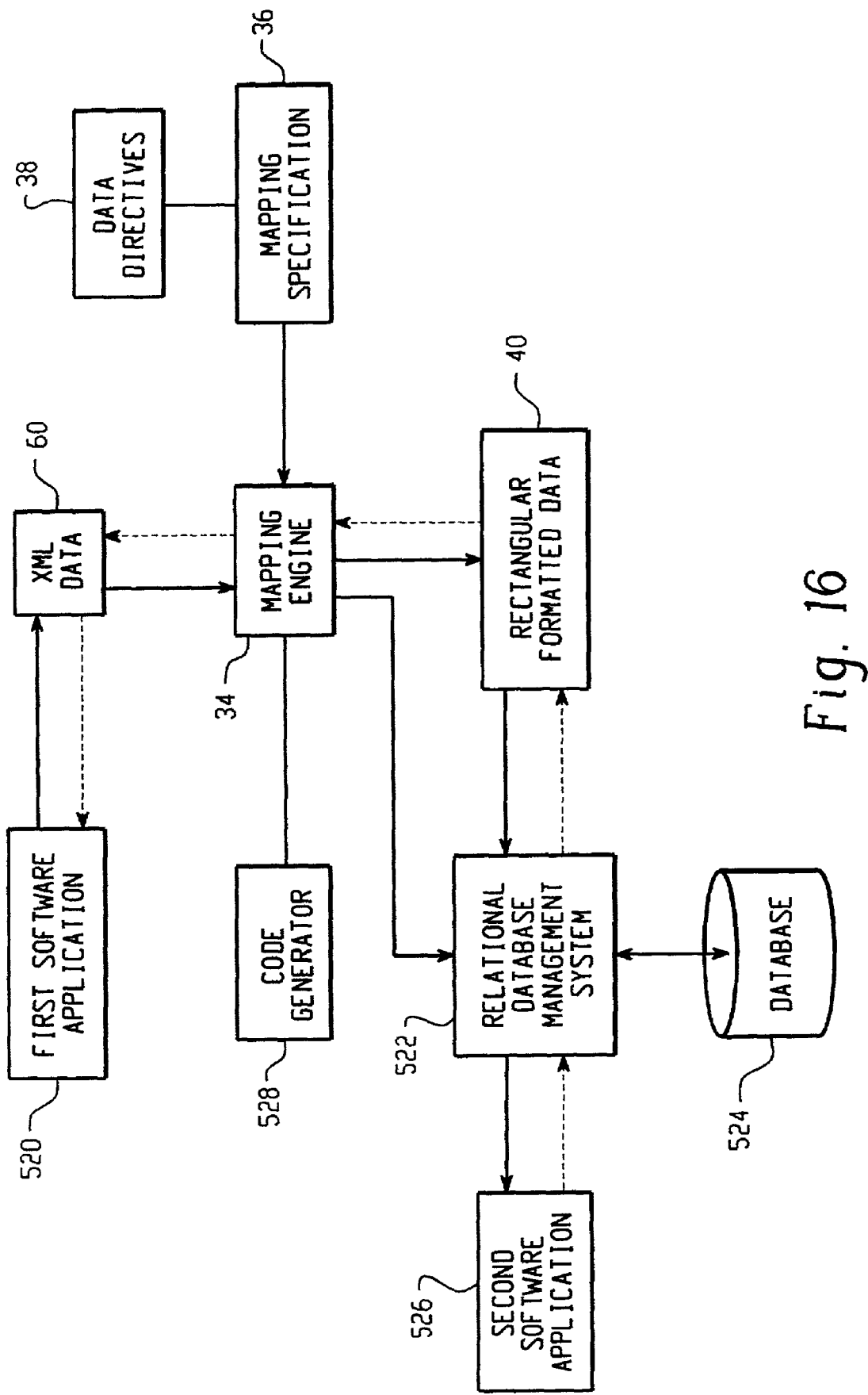

FIG. 15 depicts an Internet software application 500 being conversant only with XML formatted data 60. The Internet software application 500 may present a survey questionnaire to users regarding certain products. The compiled survey results are stored by the Internet software application 500 in the XML data file 60 so that the results may be analyzed through a sophisticated statistical analysis program 502.

Because the statistical analysis program 502 reads data sets in a rectangular format, the mapping engine 34 must act as a "go between" for the Internet software application 500 and the statistical analysis program 502. The mapping specification 36 contains data directives 38 to parse content from the XML data file 60 and format the parsed content into rectangular formatted data 40. The rectangular formatted data 40 is then analyzed by the statistical analysis program 502.

The statistical analysis program 502 may also wish to communicate all or a portion of its analysis back to the Internet software application 500. For example, the Internet software application 500 may wish to show a user how the user compared statistically to other users in answering the survey questionnaire. To accomplish this, the statistical analysis program 502 first generates its analysis as rectangular formatted data 40. The mapping engine 34 then utilizes the mapping specification 36 to specify how an XML data file 60 is to be created from the rectangular formatted data 40. The created XML data file 60 containing the analysis results is then provided to the Internet software application 500.

FIG. 16 depicts another application where a first software application 520 wishes to interact with a relationship database management system 522 (possibly to persist its information). However, the first software application 520 converses only through XML data 60 (which is not compatible with the input rectangular data format for the relational database management system 522). The mapping engine 34 parses and converts the XML data 60 from the first software application into rectangular formatted data 40. The relational database management system 522 imports the rectangular formatted data 40 into a table within database 524. The imported data is then accessible by other applications, such as a second software application 526.

The second software application 526 may also store its own information in the database 524. The first software application 526 may wish to access the information stored by the second software application 526. To effect this access, the stored information may be exported through the relational database management system 522 as rectangular formatted data 40. The mapping engine 34 utilizes the mapping specification 36 to create for the first software application XML data 60 based upon the rectangular formatted data 40. In this way, bi-directional data communication is achievable between two or more applications having different data formats.

The mapping engine 34 may also use a code generator 528 to generate structured query language (SQL) commands. The SQL commands may create tables within the RDBMS 522 based upon the mapping specification 36. The code generator 528 may also generate SQL insert commands to insert columnar data into the created tables. It should be understood that the mapping engine 34 may be used with many different types of code generators 528. For example, a code generator may create instructions to create datasets within a statistical software application and then populate the datasets with data from the input XML data 60. The generated code could also contain instructions to execute statistical programs to analyze the populated datasets.

While examples have been used to disclose the invention, including the best mode, and also to enable any person skilled in the art to make and use the invention, the patentable scope of the invention is defined by the claims, and may include other examples that occur to those skilled in the art. For example, the data directives may include many functions to indicate how input data (whether tagged or rectangular) is be processed. This may include XPath specifications for axes in order to access data that is less tightly tied to true hierarchical arrangement structures or any other non-rectangular design characteristics and input file may contain.

Other exemplary functions include XML node set functions for such operations as: returning the namespace URI (where URI stands for uniform resource identifier) of the expanded-name of the node; returning the expanded-name of the node; returning a number equal to the current parsing line; returning a number equal to the offset position into the current parsing line; or returning the namespace prefix of the expanded-name of the node.

Still further, other functions may include such string functions as described in FIGS. 17-19D. FIG. 17 depicts an XML data structure 600 whose NHL team data is to be parsed via the mapping specification 620 of FIGS. 18A-18D.

FIGS. 18A-18D show a sample mapping specification that creates a table for different string functions. The mapping specification 620 includes table tags 630 to generate a table entitled "concat". The generated table "concat" is shown in FIG. 19A at 750. The columns of table 750 illustrate different concatenations performed by the functions contained within the table tags 630. The first column demonstrates a concatenation postfix where a string is appended to an input XML data item; the second column depicts a concatenation prefix where a string is prefixed to an input XML data item; and the third column depicts both a prefix and a postfix concatenation.

With reference back to FIG. 18A, the mapping specification 620 includes table tags 640 to generate a table entitled "starts-with". The generated table "starts-with" is shown in FIG. 19A at 760. The column of table 760 shows the boolean results of testing whether an input XML team data item (from FIG. 17) starts with a particular string (which in this example is the string "new york").

With reference to FIG. 18B, the mapping specification 620 includes table tags 650 to generate a table entitled "contains". The generated table "contains" is shown in FIG. 19A at 770. The column of table 770 shows the results of testing whether an input XML data item contains a particular string (which in this example is the string "new").

With reference back to FIG. 18B, the mapping specification 620 includes table tags 660 to generate a table entitled "substring-before". The generated table "substring-before" is shown in FIG. 19B at 780. The column of table 780 shows what string occurs in an input XML data item before the string "york". Note that selected data which does not contain the pattern string returns a blank/MISSING value. This behavior may be subsequently altered by having the column definition contain <DEFAULT> and/or <ENUM> elements.

With reference back to FIG. 18B, the mapping specification 620 includes table tags 670 to generate a table entitled "substring-after". The generated table "substring-after" is shown in FIG. 19B at 790. The column of table 790 shows what string occurs in an input XML data item after the string "york". Note that selected data which does not contain the pattern string returns a blank/MISSING value. This behavior may be subsequently altered by having the column definition contain <DEFAULT> and/or <ENUM> elements.

With reference to FIG. 18C, the mapping specification 620 includes table tags 680 to generate a table entitled "substring". The generated table "substring" is shown in FIG. 19C at 800. The first column of table 800 shows for each input XML data item what characters appear as the first five characters; the second column of table 800 shows for each input XML data item what characters appear in the fifth character position and on; and the third column of table 800 shows for each input XML data item what characters appear in the fifth through eighth character positions.

With reference back to FIG. 18C, the mapping specification 620 includes table tags 690 to generate a table entitled "string-length". The generated table "string-length" is shown in FIG. 19C at 810. The column of table 810 shows the string length of each input XML data item.

With reference to FIG. 18D, the mapping specification 620 includes table tags 700 to generate a table entitled "normalize". The generated table "normalize" is shown in FIG. 19D at 820. The column of table 820 shows each input XML data item having any extraneous spaces (i.e., duplicate ASCII code 32 characters appearing between words) in its string removed.

With reference back to FIG. 18D, the mapping specification 620 includes table tags 710 to generate a table entitled "translate". The generated table "translate" is shown in FIG. 19D at 830. The first column of table 830 shows the original input XML data item; and the second column of table 830 shows results of a character search and replace operation (where the string "New" in the input XML data item was replaced with the string "Old"). However, note that this is character-for-character, global scope, replace operation. Thus the character "N" was replaced with the character "O"; the character "e" was replaced with the character "1"; and the character "w" was replaced with the character "d".

A graphical user interface 67 may help a user create mapping specifications as shown in FIGS. 20A-24C. FIGS. 20A-24C depict a graphical user interface 67 for processing tagged formatted data and rectangular formatted data. FIG. 20C depicts an exemplary interface for creating a mapping specification from tagged input data. In this example, input XML data items 900 are shown within interface region 880. The XML data items 900 contain tagged hierarchical data about NHL conferences, divisions, and teams.

For example, NHL tags 902 enclose NHL conference, division, and team data as well as their data relationships. Conference tags 904 contain Eastern Conference data. Division tags 908 contain Atlantic Division data. Name and abbreviation attributes within team tags 910 provide the names and abbreviations of teams within the Atlantic Division. For example, team tag 912 contains the name attribute "New Jersey Devils" and the team abbreviation attribute "NJ".

Figure 20A:
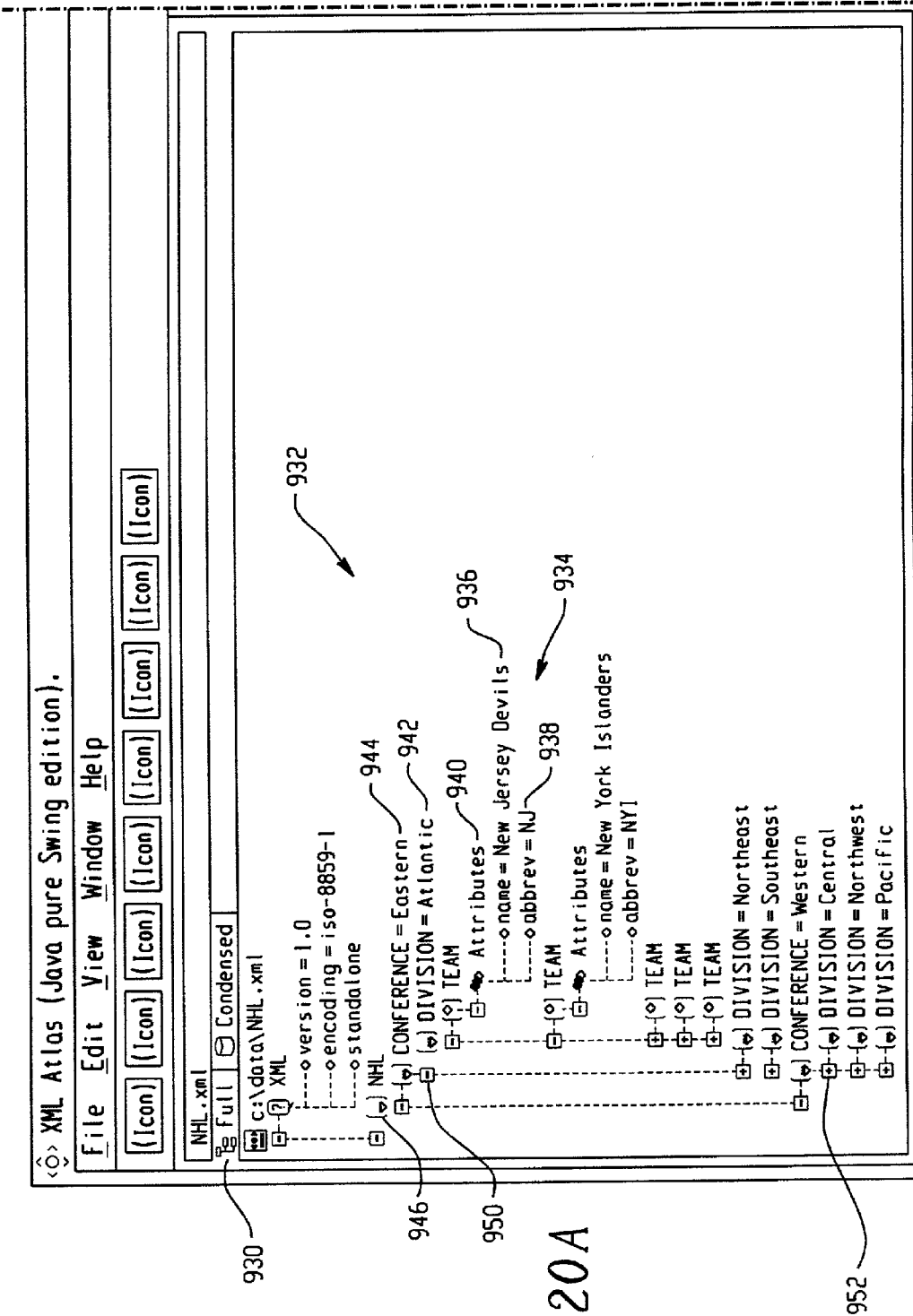
FIGS. 20A-24C depict graphical user interfaces for processing tagged data files and rectangular formatted data.

Referring to FIG. 20A, interface region 930 displays for the convenience of the user either a full or condensed hierarchical view of the XML data items 900. In the full view, the hierarchy of the XML data items 900 and their values are displayed. For example, the team tag 912 that depicts information about the New Jersey Devils is represented within the hierarchy 932 at 934. More specifically, the team name attribute "New Jersey Devils" is shown within the hierarchy 932 at 936, and the abbreviation "NJ" is shown at 938.

As shown by the indented hierarchy 932, the New Jersey Devils' attributes 940 are contained within the Atlantic Division 942 which is within the Eastern Conference 944. The Eastern Conference 944 is contained within the NHL indicator 946.

The user may expand or collapse the hierarchy 932 to show as much detail as the user desires. Indicators show the user whether a hierarchical data element is in a collapsed or expanded state. For example, a fully expanded indicator is shown at 950 to indicate that all of the data associated with the Atlantic Division is shown, while the data hierarchy for the Central Division may still be expanded as indicated by the expansion indicator 952.

Figure 20B:
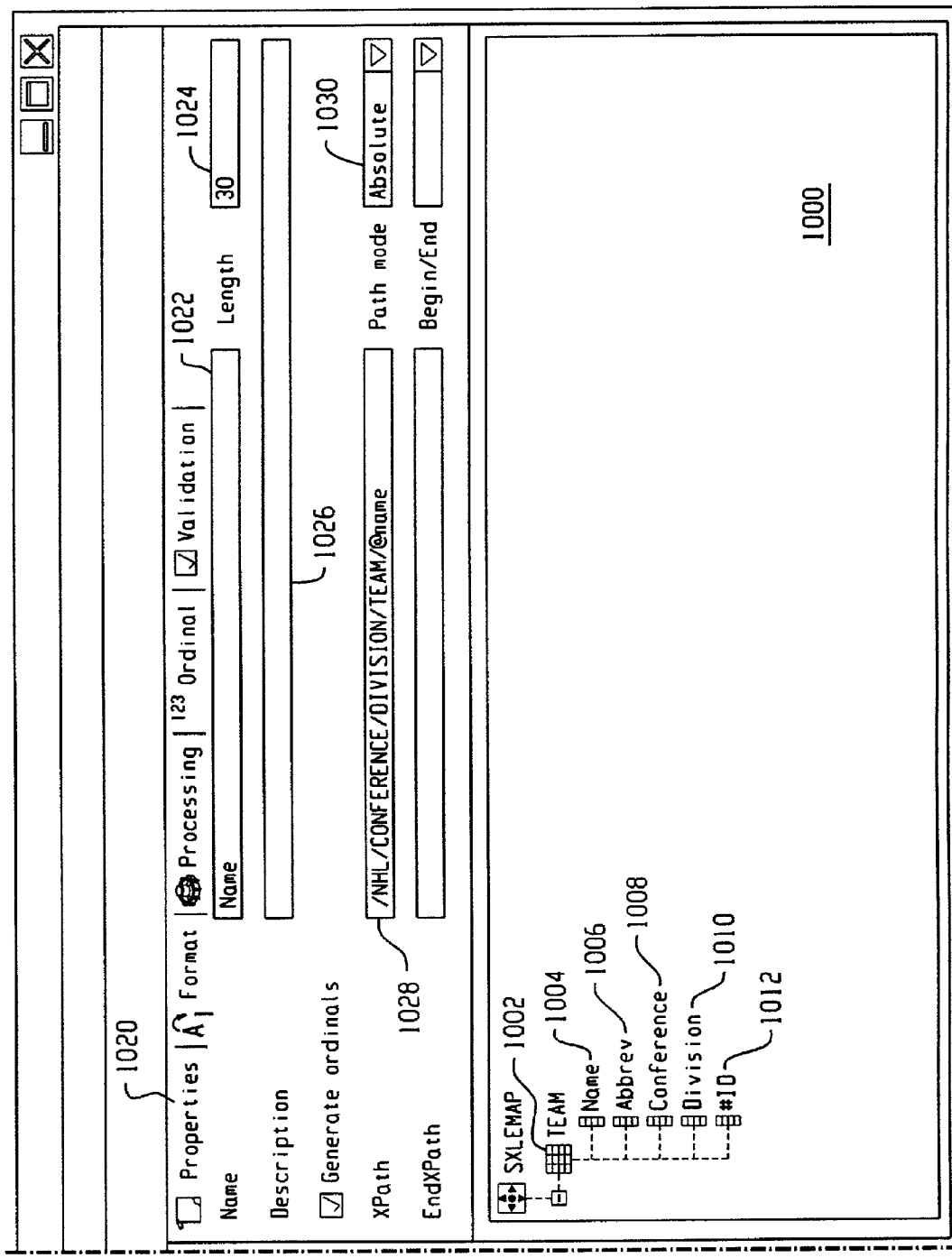

In order to create a mapping specification for the input XML data 900, interface region 1000 shown in FIG. 20B, allows the user to specify which data items within the input XML data 900 are to be a data source for the columns of rectangular formatted data. Within interface region 1000, the user creates a table which in this example is shown at 1002 and is labeled "TEAM". The user specifies the columns the table is to have. In this example, the team table 1002 contains a name column 1004, abbreviation column 1006, conference column 1008, division column 1010, and identification column 1012.

The interface region 1000 allows the user to select a column so that properties, formatting and other information associated with a column may be specified. In this situation, the name column 1004 is selected. With the properties tag 1020 selected, a user may specify or modify the name of the column within field 1022 as well as length at 1024 and a description of the column at 1026. The user may also specify the XPath value at field 1028 so that the team name data may be located within the raw XML data 900. The user may analyze the XML data hierarchy through the interface region 930 to more easily determine the proper XPath specification. The user may select at 1030 whether the XPath specification is in an absolute or relative mode.

Referring to FIG. 20D, interface region 1050 depicts a mapping specification 1052 that has been generated based upon the information provided by the user through the interface region 1000. The mapping specification 1052 contains XML data item tags 1052 that have been generated through interface region 1000. For example, the XML data items tags 1052 contain a table tag 1054 that specifies that a table is to be created labeled "TEAM". This tag was generated in accordance with the user having specified the table name through interface region 1000 at 1002.

Also in accordance with the information specified through interface 1000, data item tags were generated at 1056 that is to create a name column. An XPath data item tag 1058 within tags 1056 specifies the source of the information for this column. The XPath specification value contained within the XPath data item tag 1058 is in accordance with the XPath information supplied through interface 1000 at 1028.

Interface region 1080 in FIG. 20E shows generation of code that can be used to create rectangular formatted datasets based upon the mapping specification 1052. In other situations, code may also contain other types of instructions, such as structured query language (SQL) instructions. Such SQL instructions may be used to create and insert data within a relational database management system.

The code within interface region 1080 indicates the source of data and the statistical procedures to analyze the data. The code contains at 1082 the instructions to access files with the input data: the instruction that indicates the location of the input XML information is shown at 1082; the instruction that indicates the location of the NHL mapping specification is shown at 1084; and the instruction to access a library is specified at 1086. In this example, the library performs the following: definition of reference name for the library, processing being assigned to and conducted by the XML libname engine, a binding of the XMLMap definition to the XML input file and engine assignment, and an access setting of READONLY (non-update) on the input XML file.

At instruction 1088, a procedure is automatically executed to process the data contained within the input XML file in accordance with the XML mapping specification. Instructions 1090 and 1092 depict exemplary usages of the input data, such as performing statistical analyses at instruction 1090 and printing out the results at instruction 1092.

Figure 21A:
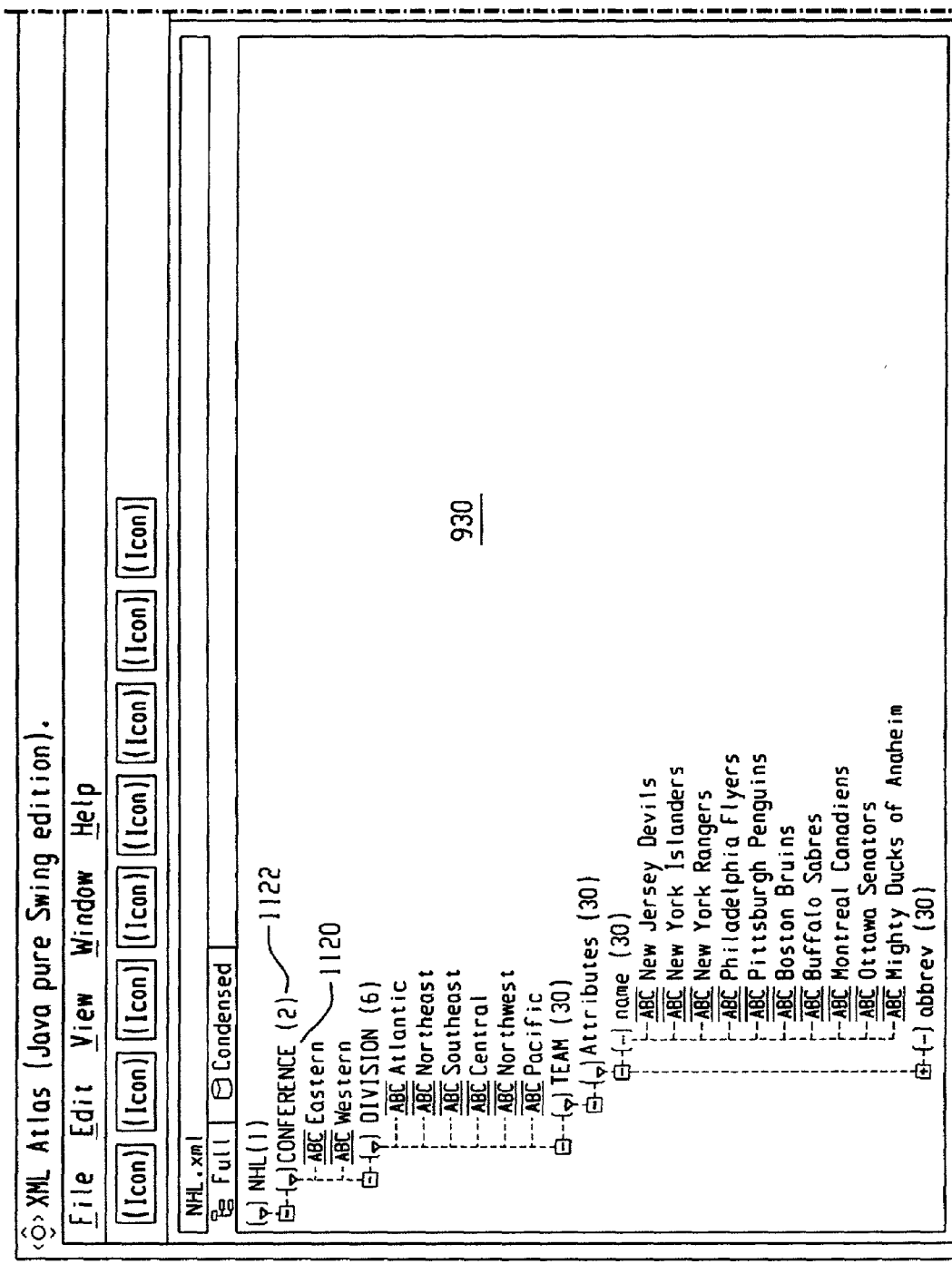
Figure 21B:
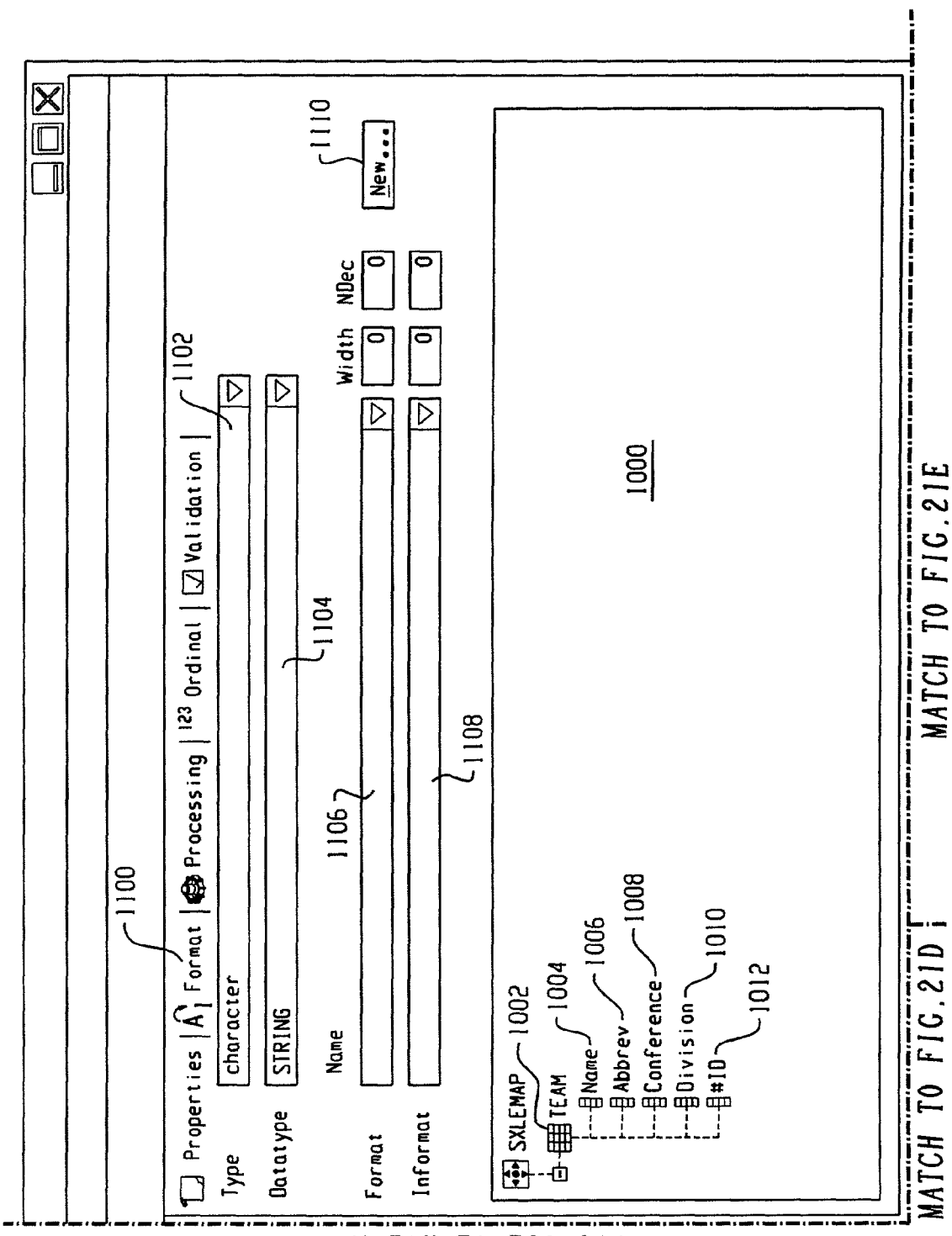

FIG. 21B shows an example where the name column 1004 and the format column tab 1100 have been activated so that the user may specify the format of a column. By activating the format column tab 1100, a user can specify such formatting items as the type, data type, format, informat, or even a new type of format as shown at 1110. In this situation, the user has specified that the name column 1004 has a character type and a string data type. Specification of this information through interface 1000 is used to create mapping specification information. This information is reflected in FIG. 21D within the mapping specification 1052 at tags 1120 and 1122. Type tags 1120 specify as a data directive that the column name 1056 has a character type. This is in accordance with the user having specified such a type at type field 1102. Similarly, the data type tags 1122 specify that the name column has a data type of string in accordance with the data type field 1104 within interface 1000.

The graphical user interface 67 also shows a condensed view of the input XML data in FIG. 21A within interface region 930. The condensed view shows the unique values an element has. For example, the conference element 1120 shows underneath it the unique values that the conference element has (i.e., Eastern and Western conference values). The fact that the conference element contains two unique values is shown by the number "2" located at 1122.

Figure 21E:
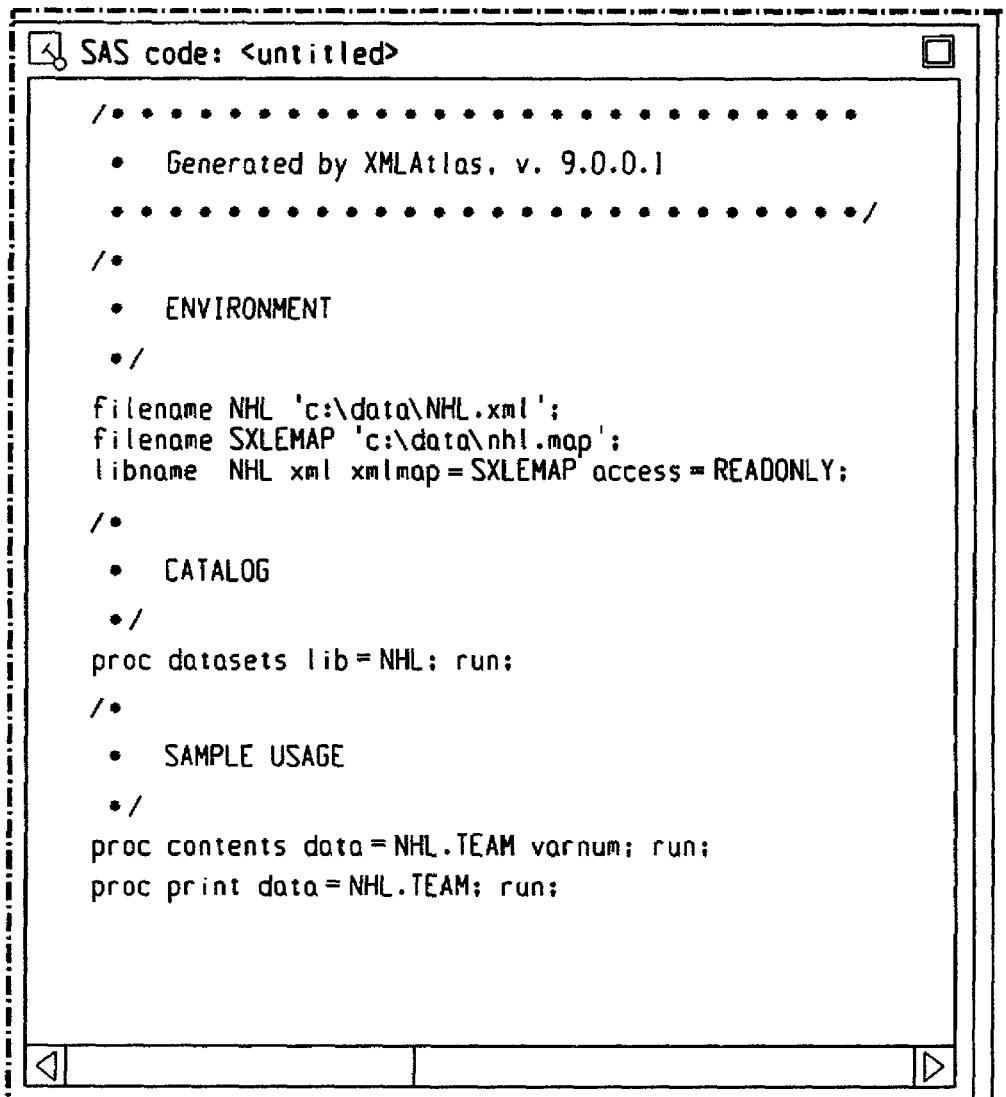

Additionally, FIG. 21 C depicts an exemplary interface for creating a m n specification from tagged input data. In this example, input XML data items 900 are shown. FIG. 21 E shows generation of code used to create rectangular formatted data sets based upon the mapping specification 1052.

Figure 22A:
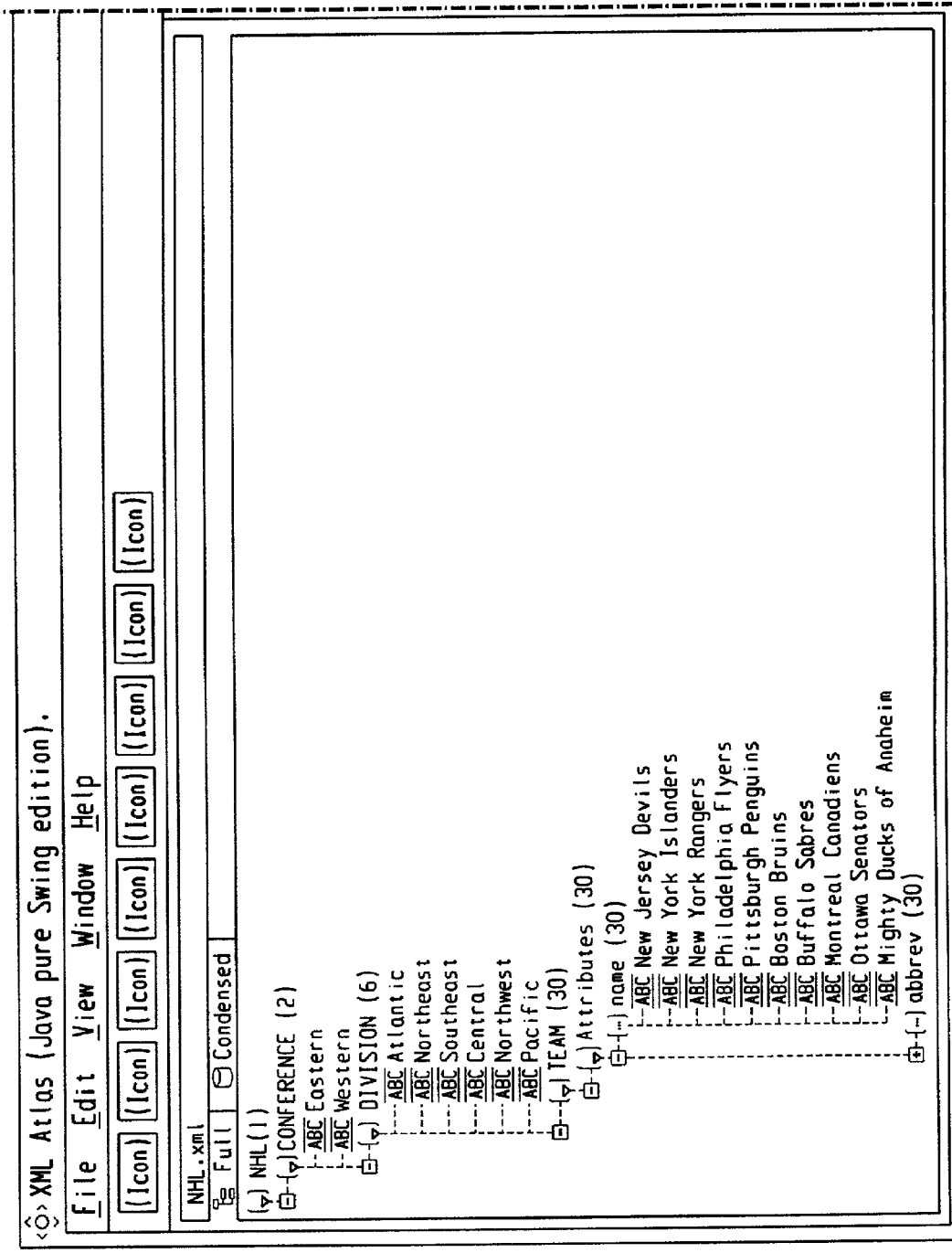
Figure 22B:
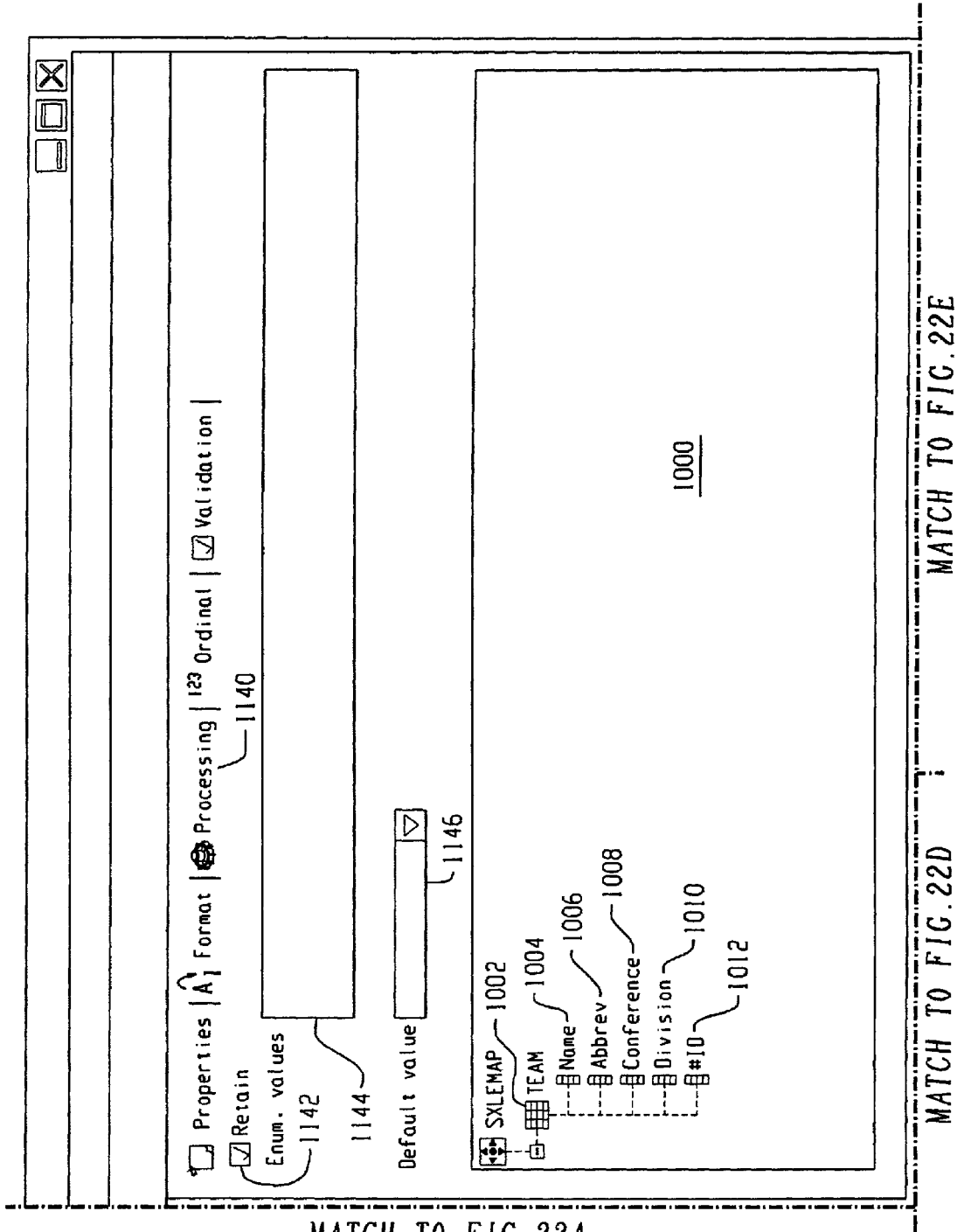

FIG. 22B depicts a graphical user interface where the conference column 1008 and the processing tab 1140 have been activated. Within interface region 1000, the user may specify whether the conference values contained within the XML data 900 (shown in FIG. 22C), are to be retained as shown by check box 1142. The user may choose to enumerate values for the conference column 1008 within field 1144 and/or specify a default value at field 1146 for when a conference value is missing.

In FIG. 22D, data directives are created and placed within the mapping specification 1052 in accordance with the information provided through interface 1000 for the conference column 1008. For example, the data directive that the conference values are to be retained is shown within conference column tag 1160 at 1162.

FIG. 22A shows a condensed view of the input XML data. FIG. 22E shows generation of code used to create rectangular formatted data sets.

Figure 23A:
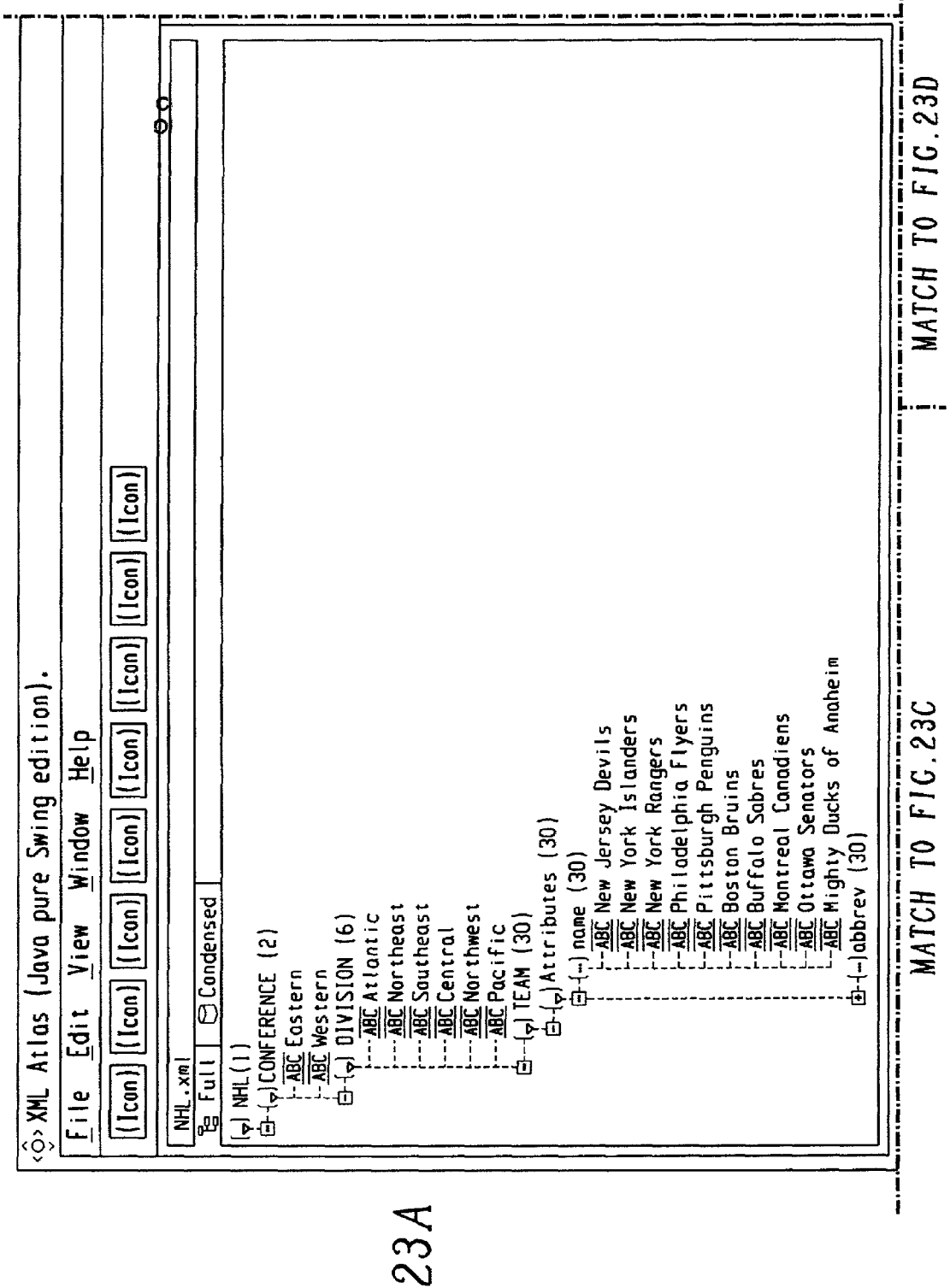
Figure 23B:
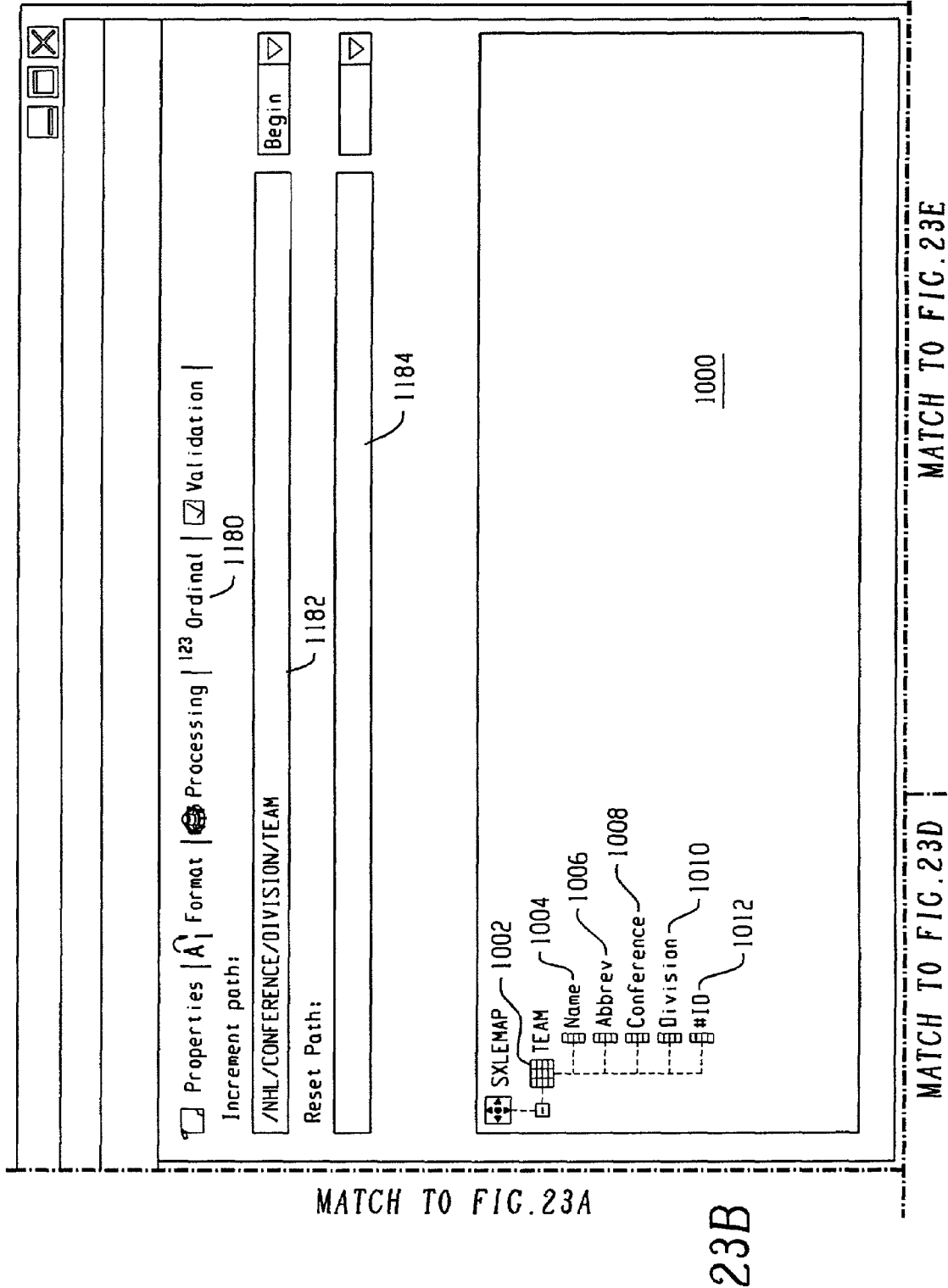

FIG. 23B shows an example where the identification column 1012 and the ordinal tab 1180 are activated. The ordinal tab 1180 is used to indicate that a column's value is to be incremented. In this situation, the user has specified through the increment path at field 1182 how values within this column are to be incremented. The increment path field 1182 indicates that the identification number is to be incremented whenever a new team value is found within the XML data 900 (as shown in FIG. 23C).

For the mapping specification 1052 (shown in FIG. 23D), data directives are generated based upon the information supplied through interface 1000 so that the identification column may be provided with proper increment values. Identification column tag 1190 of the mapping specification 1052 specifies that this column is to be incremented as shown at 1192. This increment data directive is set in the mapping specification at 1194 in accordance with the increment path specified at 1182. It is noted that at 1184 a user may specify when an increment value is to be reset.

FIG. 23A shows a condensed view of the input XML data. FIG. 22E shows generation of code used to create rectangular formatted data sets.

Figure 24A:
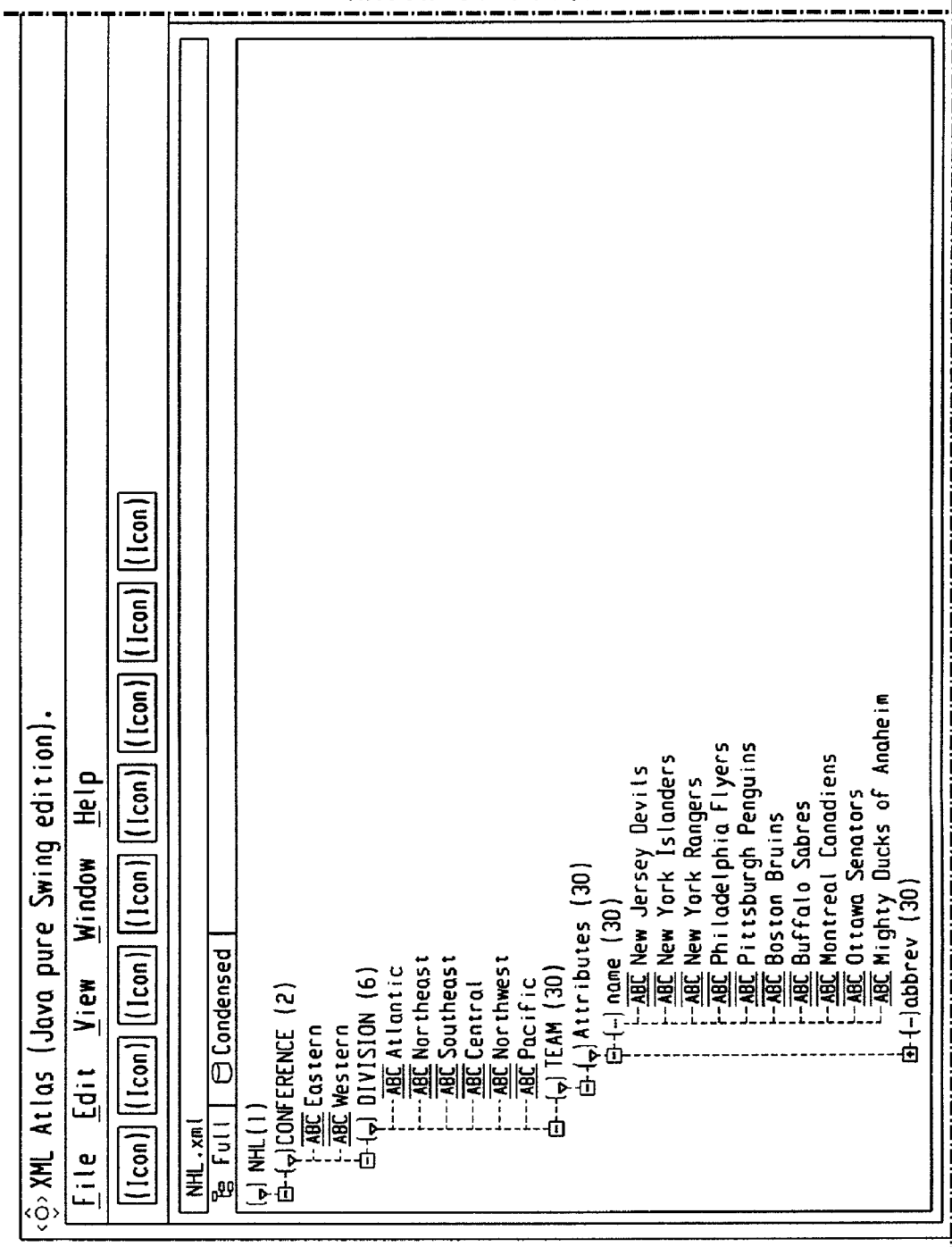
Figure 24B:
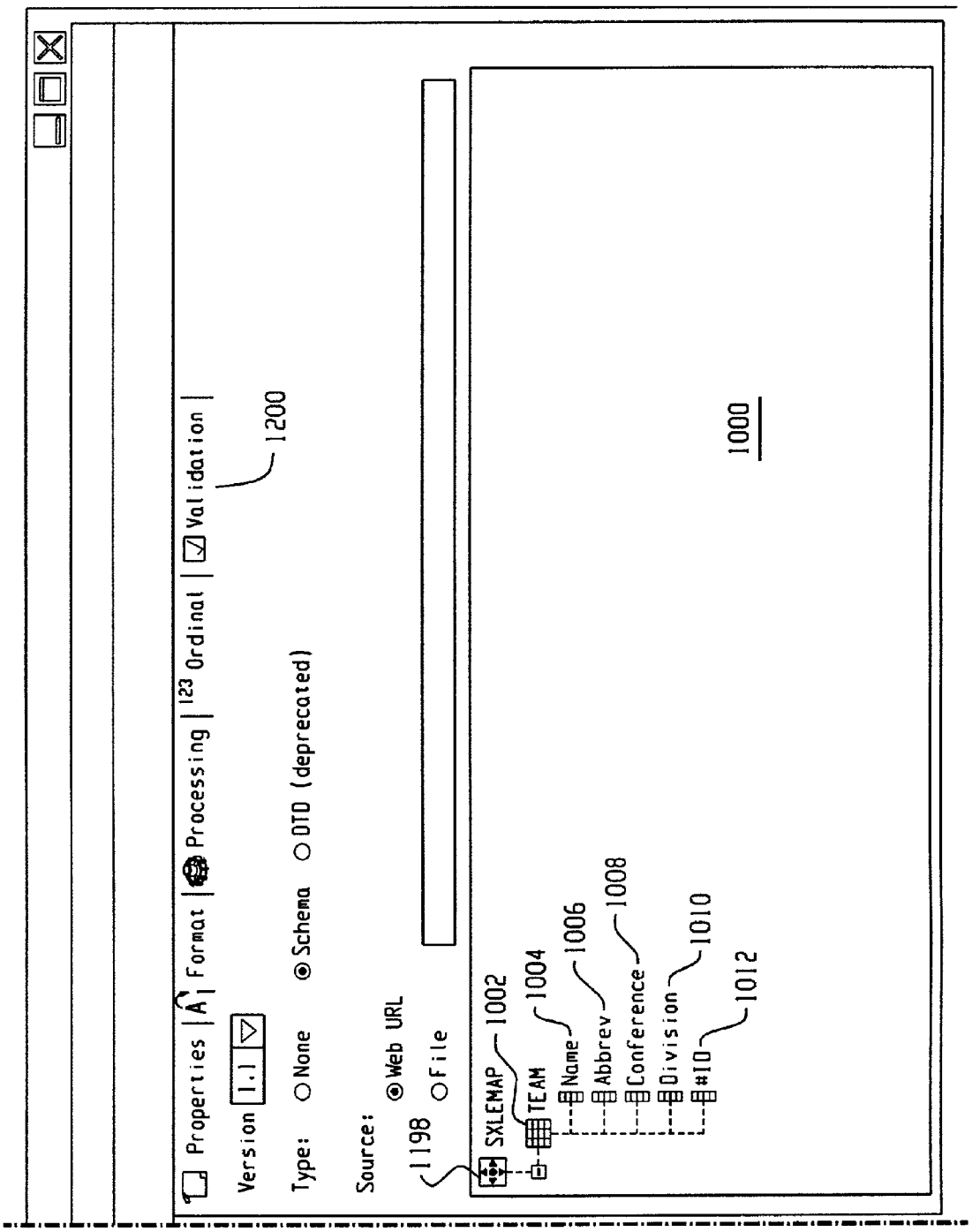

FIG. 24B shows where the SXLEMAP indicator 1198 and the validation tab 1200 have been activated. The SXLEMAP indicator 1198 is used to denote all the tables that are to be constructed. It should be understood that while this example shows one table being processed, the graphical user interface 67 may be used to designate and construct multiple tables within interface region 1000 at the same time.

Selection of the validation tab 1200 allows a user to validate one or more aspects of the table(s) to be constructed. For example, the user may specify that the schema for the table(s) shown within interface 1000 is to be validated with respect to the input XML data. It should be understood that other types of validation may be performed, such as "DTD" (deprecated) which allows the following to be done: tag name conventions, tag order validation, and appropriate attribute usage.

The user may also designate the source as either a web uniform resource locator (URL) or as a file. The user may do this in order to access a personal (or modified) copy of the validation file from a local file system should the user be unable to otherwise access a web-based URL, perhaps due to a corporate firewall restriction, etc.

Figure 24C:
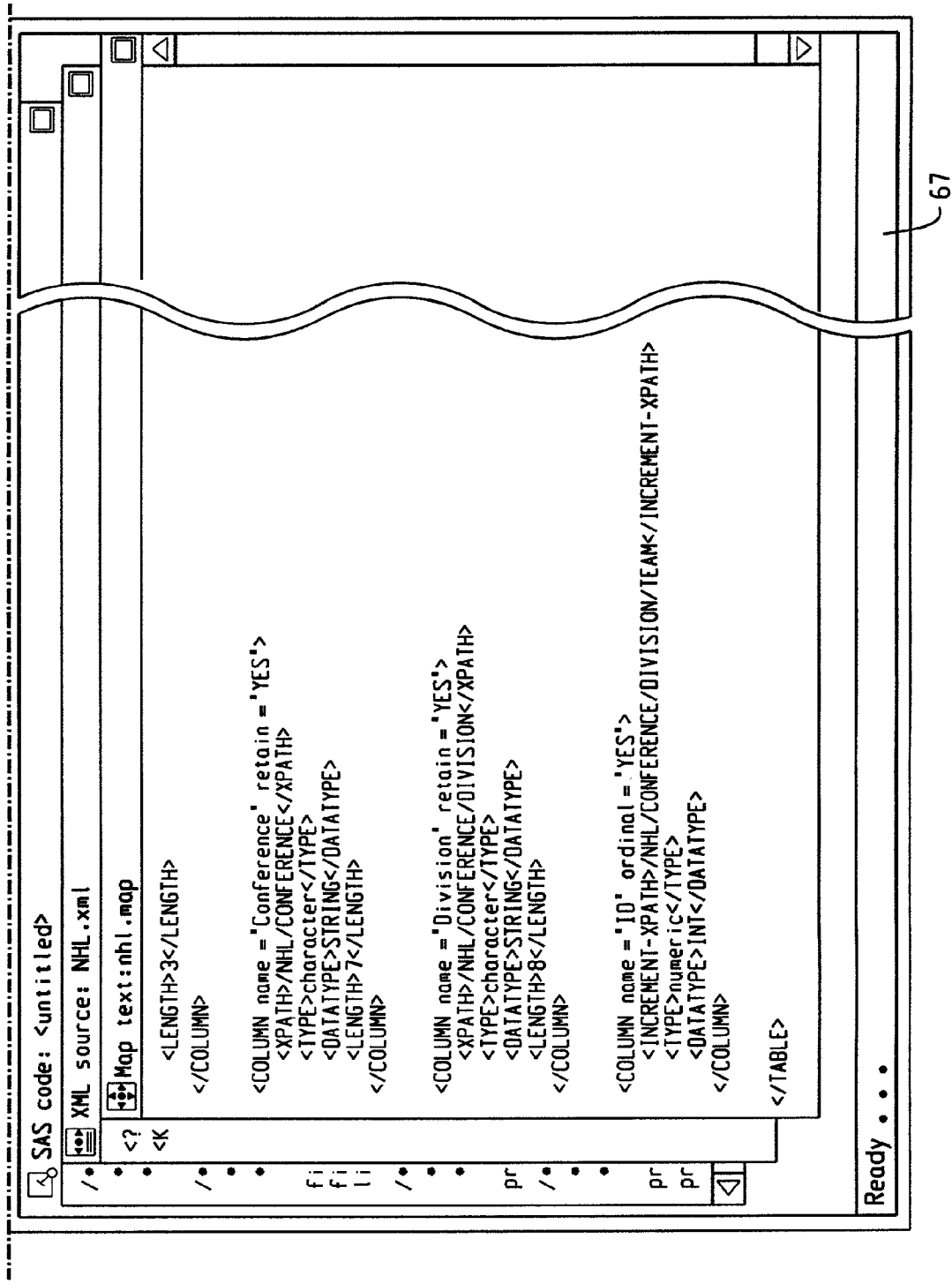

FIG. 24A shows a condensed view of the input XML data. FIG. 24C shows a layered view of the remaining windows.

It should be understood that the graphical user interface may be implemented in many ways, such as in separate windows within a window-based system, or as a series of web pages that a user may access, or through a number of other ways. Moreover, the graphical user interface can be utilized to accept rectangular formatted data as input. In this way, mapping specifications may be created to transform the input rectangular data into non-rectangular formatted data. Interface regions are used to show the raw input columnar data, the table structure and format, as well as interface regions to allow the user to designate the tagged data hierarchy. This information may then be used to construct and display a mapping specification that will transform the rectangular formatted input data into a tagged hierarchical format.

It is claimed:

1. Computer-readable storage medium or mediums encoded with instructions that when executed, cause a computer to perform a data structure conversion method, comprising:
   receiving hierarchically arranged tagged input data in a non-rectangular format;
   analyzing the hierarchically arranged tagged input data to determine one or more data relationships between one or more parent tags and one or more child tags, wherein each parent tag is associated with two or more child tags;
   using the determined one or more data relationships to determine rectangularization characteristics for the hierarchically arranged tagged input data;
   using the rectangularization characteristics to form a mapping specification including one or more data directives, wherein forming the mapping specification includes identifying one or more tables that will be generated from the hierarchically arranged tagged input data, and wherein each association between a parent tag and two or more child tags forms a single corresponding table specific to that association;
   processing the mapping specification to generate an XPath list, the XPath list specifying data items that are to be extracted from the hierarchically arranged tagged input data;
   processing the XPath list to gather data from the hierarchically arranged tagged input data; and
   using the gathered data to generate a map including one or more output observations.

2. The method of claim 1, further comprising:
   checking encoding contained in the mapping specification to ensure it conforms to the data hierarchy of the tagged input data.

3. The method of claim 1, further comprising:
   recording metadata, the metadata facilitating data conversion from source data formats to destination data formats, column length alignment, and data buffering prioritization for projection.

4. The method of claim 3, further comprising:
   projecting one or more tables and one or more columns.

5. The method of claim 1, wherein the tagged input data is in an eXtensible Markup Language (XML) format.

6. The method of claim 1, wherein the tagged input data includes one or more pcdata fields within the tags of the tagged input data, and wherein the tagged input data includes one or more attributes within the tags of the tagged input data.

7. The method of claim 1, wherein the one or more data directives include a hierarchical arrangement of tags indicating one or more relationships among conversion operations and attributes corresponding to the one or more data directives.

8. The method of claim 7, wherein the one or more data relationships provide information about how the conversion operations and the attributes corresponding to the one or more data directives are used to automatically parse the tagged input data.

9. The method of claim 1, wherein the one or more data directives include one or more definitions.

10. The method of claim 9, wherein the one or more definitions include a column length.

11. The method of claim 9, wherein the one or more definitions include a column data type.

12. The method of claim 9, wherein the one or more definitions include a column type.

13. The method of claim 9, wherein the one or more definitions include acceptable values for a column.

14. The method of claim 9, wherein the one or more definitions include an indication that a value for a data item within the tagged input data is retained until a new value for the data item is encountered in the tagged input data.

15. The method of claim 9, wherein the one or more definitions include a selection criterion for filtering one or more data items contained within the tagged input data.

16. The method of claim 9, wherein the one or more definitions include a string function.

17. The method of claim 9, wherein the one or more definitions include an axes function.

18. The method of claim 9, wherein the one or more definitions include a node-related function.

19. The method of claim 1, wherein a default value is specified and applied when a value for a data item within the tagged input data is missing.

20. The method of claim 1, wherein column content is generated based upon one or more data items contained within the tagged input data.

21. The method of claim 1, wherein at least one of the one or more data directives is expressed in an XPath locator format for locating data items within the tagged input data.

22. The method of claim 1, wherein an XML parser is used to automatically parse the tagged input data based upon the one or more data directives.

23. The method of claim 1, wherein the tagged input data includes one or more tagged hierarchical paths, and wherein a specific tagged hierarchical path uses an XML path descriptor to identify which of the tags in the tagged input data is to be used as an indicator.

24. A system, comprising:
one or more processors;
a computer-readable storage medium containing instructions configured to cause the one or more processors to perform operations, including:
receiving hierarchically arranged tagged input data in a non-rectangular format;
analyzing the hierarchically arranged tagged input data to determine one or more data relationships between one or more parent tags and one or more child tags, wherein each parent tag is associated with two or more child tags;
using the determined one or more data relationships to determine rectangularization characteristics for the hierarchically arranged tagged input data;
using the rectangularization characteristics to form a mapping specification including one or more data directives, wherein forming the mapping specification includes identifying one or more tables that will be generated from the hierarchically arranged tagged input data, and wherein each association between a parent tag and two or more child tags forms a single corresponding table specific to that association;
processing the mapping specification to generate an XPath list, the XPath list specifying data items that are to be extracted from the hierarchically arranged tagged input data;
processing the XPath list to gather data from the hierarchically arranged tagged input data; and
using the gathered data to generate a map including one or more output observations.

25. A computer-program product, tangibly embodied in a machine-readable storage medium, including instructions configured to cause a data processing apparatus to:
receive hierarchically arranged tagged input data in a non-rectangular format;
analyze the hierarchically arranged tagged input data to determine one or more data relationships between one or more parent tags and one or more child tags, wherein each parent tag is associated with two or more child tags;
use the determined one or more data relationships to determine rectangularization characteristics for the hierarchically arranged tagged input data;
use the rectangularization characteristics to form a mapping specification including one or more data directives, wherein forming the mapping specification includes identifying one or more tables that will be generated from the hierarchically arranged tagged input data, and wherein each association between a parent tag and two or more child tags forms a single corresponding table specific to that association;
process the mapping specification to generate an XPath list, the XPath list specifying data items that are to be extracted from the hierarchically arranged tagged input data;
process the XPath list to gather data from the hierarchically arranged tagged input data; and
use the gathered data to generate a map including one or more output observations.

* * * * *